(12) United States Patent
Nakatsuka et al.

(10) Patent No.: US 8,653,717 B2
(45) Date of Patent: Feb. 18, 2014

(54) VIBRATION POWER GENERATOR, VIBRATION POWER GENERATING DEVICE, AND ELECTRONIC DEVICE AND COMMUNICATION DEVICE HAVING VIBRATION POWER GENERATING DEVICE MOUNTED THEREON

(75) Inventors: Hiroshi Nakatsuka, Osaka (JP); Keiji Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/517,392

(22) PCT Filed: Dec. 22, 2010

(86) PCT No.: PCT/JP2010/007425
§ 371 (c)(1),
(2), (4) Date: Aug. 15, 2012

(87) PCT Pub. No.: WO2011/077717
PCT Pub. Date: Jun. 30, 2011

(65) Prior Publication Data
US 2012/0306313 A1    Dec. 6, 2012

(30) Foreign Application Priority Data
Dec. 25, 2009 (JP) ................. P 2009-293721

(51) Int. Cl.
*H02N 1/00* (2006.01)
*H02N 1/04* (2006.01)
*H02N 1/06* (2006.01)
*H02N 1/08* (2006.01)

(52) U.S. Cl.
USPC ............... 310/309; 310/310; 310/40 MM; 322/2 A; 322/2 R; 322/3

(58) Field of Classification Search
USPC ....... 310/300, 308, 309, 310; 322/2 A, 2 R, 3; 600/437, 459
See application file for complete search history.

(56) References Cited

U.S. PATENT DOCUMENTS 6,670,738 B2 *  12/2003  Kasahara et al. ............. 310/309
6,774,534 B2 *   8/2004  Akiba et al. .................. 310/309

(Continued)

FOREIGN PATENT DOCUMENTS

| CN | 101785175 | 7/2010 |
|---|---|---|
| JP | 2005-529574 | 9/2005 |

(Continued)

OTHER PUBLICATIONS

Chinese Office Action issued Mar. 19, 2013 in Chinese Patent Application No. 201080058299.6.

(Continued)

*Primary Examiner* — Terrance Kenerly
(74) *Attorney, Agent, or Firm* — Wenderoth, Lind & Ponack, L.L.P.

(57) ABSTRACT

A vibration power generator includes a first substrate, a first electrode disposed on a lower surface of the first substrate and including a film retaining electric charges, a second substrate opposing the lower surface of the first substrate, a second electrode disposed on an upper surface of the second substrate, a third electrode disposed on the upper surface of the first substrate and including a film retaining the electric charges, a third substrate opposing the upper surface of the first substrate, and a fourth electrode disposed on a lower surface of the third substrate and opposing the third electrode. The film of the first electrode has a polarity different from a polarity of the film of the third electrode, and the vibration power generator includes a restoring force generation member giving a restoring force when an external force is not exerted to the first substrate.

18 Claims, 22 Drawing Sheets

(56) References Cited

U.S. PATENT DOCUMENTS

| | | | |
|---|---|---|---|
| 8,304,958 B2* | 11/2012 | Aoyagi et al. | 310/309 |
| 2003/0209952 A1* | 11/2003 | Akiba et al. | 310/309 |
| 2003/0218404 A1* | 11/2003 | Akiba et al. | 310/309 |
| 2004/0007877 A1 | 1/2004 | Boland et al. | |
| 2004/0016120 A1 | 1/2004 | Boland et al. | |
| 2005/0023547 A1* | 2/2005 | Hartwell et al. | 257/99 |
| 2006/0131988 A1* | 6/2006 | Fasen | 310/309 |
| 2008/0048521 A1 | 2/2008 | Mabuchi et al. | |
| 2008/0122313 A1 | 5/2008 | Mabuchi et al. | |
| 2011/0266915 A1 | 11/2011 | Matsubara et al. | |
| 2013/0026880 A1* | 1/2013 | Aoyagi et al. | 310/300 |

FOREIGN PATENT DOCUMENTS

| | | |
|---|---|---|
| JP | 2008-278607 | 11/2008 |
| JP | 2009-33809 | 2/2009 |
| JP | 2009-124807 | 6/2009 |
| JP | 2009-219353 | 9/2009 |
| WO | 2009/054251 | 4/2009 |

OTHER PUBLICATIONS

International Search Report issued Feb. 22, 2011 in International (PCT) Application No. PCT/JP2010/007425.

International Preliminary Report on Patentability issued Apr. 3, 2012 in International (PCT) Application No. PCT/JP2010/007425.

Takumi Tsutsumino et al., "Seismic Power Generator Using High-Performance Polymer Electret", IEEE Int. Conf. MEMS 2006, Istanbul, Turkey, Jan. 22-26, 2006, pp. 98-101.

* cited by examiner (a)

(b)

(a)

(b)

VIBRATION POWER GENERATOR, VIBRATION POWER GENERATING DEVICE, AND ELECTRONIC DEVICE AND COMMUNICATION DEVICE HAVING VIBRATION POWER GENERATING DEVICE MOUNTED THEREON

TECHNICAL FIELD

The present invention relates to a vibration power generator and a vibration power generating device, and a communication device and electronic device having the vibration power generating device mounted thereon. More particularly, the present invention relates to an electrostatic induction type vibration power generator and the vibration power generating device using an electret material, and the communication device and the electronic device having the vibration power generating device mounted thereon.

BACKGROUND ART

As a conventional vibration power generating device, known is an electrostatic induction type vibration power generating device in which an electric charge is applied to one of electrodes of a variable capacity and the electric charge is induced to the other opposing electrodes via the electrostatic induction. The variation of capacity changes induced electric charge. The electrostatic induction type vibration power generating device generates electric power by extracting the change of the electric charge in the form of the electric energy (for example, see, Patent Literature 1).

FIG. 22 illustrates a schematic cross sectional view of a vibration power generator 10 disclosed in Patent Literature 1 (see, FIG. 4 and pages 10 to 11 of Patent Literature 1) as an example of a conventional electrostatic induction type vibration power generator using an electret material. The vibration power generator 10 is composed of a first substrate 11 provided with a plurality of conductive surface areas 13 and a second substrate 16 provided with a plurality of electret material areas 15. The first substrate 11 and the second substrate 16 are disposed so as to be spaced apart each other for a predetermined distance. The second substrate 16 including the electret material areas 15 is secured. The first substrate 11 including the conductive surface areas 13 is coupled to fixation structures 17 through springs 19. The springs 19 are connected to both side surfaces of the first substrate and further connected to the fixation structures 17. The first substrate 11 can be returned to (i.e., held by) a home position owing to the springs 19. Alternatively, the first substrate 11 can move laterally (e.g., can move horizontally in FIG. 22) to return to the home position. With the movement, an overlapped area between the electret material areas 15 and the opposing conductive surface areas 13 increases/decreases, resulting in changing electric charges of the conductive surface areas 13. The vibration power generator (i.e., electrostatic induction type vibration power generator) 10 generates electric power by extracting the change of the electric charges in the form of the electrical energy.

CITATION LIST

Patent Literatures

Patent Literature 1: JP 2005-529574A

Non Patent Literature

Non Patent Literature 1: T. Tsutsumino, Y. Suzuki, N. Kasagi, and Y. Sakane, SeismicPower Generator Using High-Performance Polymer Electret, IEEE Int. Conf. MEMS 2006, Istanbul, (2006), pp.

SUMMARY OF INVENTION

Technical Problem

In a conventional vibration power generator, wiring is required to be drawn out from the conductive surface areas in order to extract the electrical energy from the first substrate. However, the first substrate on which the conductive surface areas are formed is held movably via the springs, so that it is not easy to provide the wiring by drawing out from the first substrate.

In view of the above, there have been problems that the wiring for extracting the electrical energy from the first substrate may impede vibration of the first substrate and that the wiring may be suffered from aged deterioration to be disconnected because of the vibration of the first substrate.

In a case where the electrets are provided with the first substrate instead of the conductive surface areas, a rear-side electrodes are required to be disposed on the first substrate in order for stabilization of surface potentials of the electrets. As a result thereof, a problem arises that the wiring for grounding the surface potentials is needed to be provided.

In view of the above, a purpose of the present invention is to provide a vibration power generator in which the wiring from the movably held substrate can be omitted or simplified.

Another purpose of the present invention is to provide a vibration power generating device including the above described vibration power generator and, a communication device and the electronic device having the vibration power generating device mounted thereon.

Solution to Problem

According to a first aspect of the present invention, a vibration power generator includes a first substrate, a first electrode which is disposed on a lower surface of the first substrate and includes a film retaining electric charges, a second substrate which is disposed away from the first substrate and opposed to the lower surface of the first substrate, a second electrode disposed on an upper surface of the second substrate so as to be opposed to the first electrode, third electrode which is disposed on the upper surface of the first substrate and includes a film retaining the electric charges, a third substrate which is disposed away from the first substrate and opposed to the upper surface of the first substrate, and a fourth electrode which is disposed on a lower surface of the third substrate so as to be opposed to the third electrodes, wherein the film retaining the electric charges of the first electrodes retains electric charges has a polarity different from a polarity of the film retaining the electric charges of the third electrode, the vibration power generator further includes a restoring force generation member for giving a restoring force, in which the first substrate is held at a predetermined position when an external force is not exerted to the first substrate, and the first substrate is restored to the predetermined position when the external force is exerted to the first substrate and thus the first substrate moves with respect to the second substrate.

A second aspect of the present invention is the vibration power generator according to the first aspect, wherein the restoring force generation member includes a fifth electrode which is disposed on the lower surface of the first substrate and includes a film retaining electric charges, and a sixth electrode which is disposed on the upper surface of the second substrate, include a film retaining electric charges, and disposed so as to generate an electrostatic force between the fifth electrode and the sixth electrode.

A third aspect of the present invention is the vibration power generator according to the second aspect, wherein the film retaining the electric charges of the fifth electrode retains electric charges having a polarity identical to that of the electric charges of the film retaining the electric charges of the sixth electrode.

A fourth aspect of the present invention is the vibration power generator according to the second or third aspect, wherein the restoring force generation member includes a seventh electrode which is disposed on the upper surface of the first substrate and includes a film retaining electric charges, and an eighth electrode which is disposed on the lower surface of the third substrate, includes a films retaining electric charges, and disposed so as to generate an electrostatic force between the seventh electrode and the eighth electrode.

A fifth aspect of the present invention is the vibration power generator according to the fourth aspect, wherein the film retaining the electric charges of the seventh electrode retains electric charges has a polarity identical to that of the electric charges of the film retaining the electric charges of the eighth electrode.

A sixth aspect of the present invention is the vibration power generator according to the fourth or fifth aspect, wherein the fifth electrode is disposed in the vicinity of an end face of the first substrate, the sixth electrode is disposed in the vicinity of an end face of the second substrate and at a position at which the fifth electrode and the sixth electrode do not overlap each other even when the first substrate vibrates, the seventh electrode is disposed in the vicinity of an end face of the first substrate, and the eighth electrode is disposed in the vicinity of an end face of the third substrate and at a position at which the seventh electrode and the eighth electrode do not overlap to each other even when the first substrate vibrates.

A seventh aspect of the present invention is the vibration power generator according to the fourth or fifth aspect, wherein the fifth electrode is disposed on a central portion of the first substrate, the sixth electrode is disposed on a central portion of the second substrate and at a position at which the fifth electrode and the sixth electrode do not overlap to each other even when the first substrate vibrates, the seventh electrode is disposed at the central portion of the first substrate, and the eighth electrode is disposed on the central portion of the third substrate and at a position at which the seventh electrode and the eighth electrode do not overlap to each other even when the first substrate vibrates.

An eighth aspect of the present invention is the vibration power generator according to the fourth or fifth aspect, wherein the sixth electrode is formed along an outer circumferential portion of the second substrate, the second electrode is formed inside the sixth electrode and electrically connected to the outside via a notch portion provided in the sixth electrode, the eighth electrode is formed along an outer circumferential portion of the third substrate, and the fourth electrode is formed inside the eighth electrode and electrically connected to the outside via a notch portion provided on the eighth electrode.

A ninth aspect of the present invention is the vibration power generator according to any one of the first through eighth aspects, wherein the film retaining the electric charges of the first electrode has a thickness different from that of the film retaining the electric charges of the third electrode.

A tenth aspect of the present invention is the vibration power generator according to any one of the first through ninth aspects, wherein the restoring force generation member includes an elastic spring connected to the first substrate.

An eleventh aspect of the present invention is the vibration power generator according to any one of the first through tenth aspects including a projection which is secured to the second substrate or the third substrate at one end of the projection and is contactable to the first substrate at the other end of the projection.

A twelfth aspect of the present invention is the vibration power generating device including the vibration power generator according to any one of the first through eleventh aspects and a rectifying circuit for rectifying an AC output voltage from the vibration power generator to convert the rectified AC output voltage to a DC voltage.

A thirteenth aspect of the present invention is the vibration power generating device according to the twelfth aspect including a voltage conversion circuit for converting the DC voltage output from the rectifying circuit into a desirable voltage level, a battery circuit for storing electric power generated by the vibration power generator in a case where no output from the vibration power generating device is required, a voltage-controlled circuit for controlling an output voltage from the voltage conversion circuit or the battery circuit to be a predetermined voltage, and an output switching circuit for switching an output of the voltage conversion circuit to the battery circuit or the voltage-controlled circuit.

A fourteenth aspect of the present invention is the vibration power generating device according to the thirteenth aspect, wherein an output voltage output from the voltage conversion circuit is set to a value higher than a value of an output voltage output from the vibration generation circuit.

A fifteenth aspect of the present invention is a communication device using the vibration power generating device according to any one of the twelfth through fourteenth aspects.

A sixteenth aspect of the present invention is a communication device including the vibration power generator according to any one of the above first through eleventh aspects and a battery A seventeenth aspect of the present invention is electronic device using the vibration power generating device according to any one of the twelfth through fourteenth aspects.

An eighteenth aspect of the present invention is electronic device including the vibration power generator according to any one of the above first through eleventh aspects and a battery.

Advantageous Effects of Invention

The invention of the present application can provide a vibration power generator, a vibration power generating device, and a communication device and electronic device mounted with the vibration power generating device, capable of omitting or simplifying wirings from a movably supported substrate.

DESCRIPTION OF EMBODIMENTS

Embodiments of the present invention will be described in detail below with reference to the accompanying drawings. In the following description, terminologies indicating specific directions and positions (e.g., terminologies including above, below, right, and left and other terminologies including meanings thereof) are used, as required. However, those terminologies are used for the purpose of easy understanding of the present invention with reference to the attached drawings and thus meanings of those terminologies would not limit the scope of technology of the present invention. Portions provided with the same numbers and/or symbols shown in a plurality of drawings indicates the same portions or same members.

1. Embodiment 1

Figure 1:
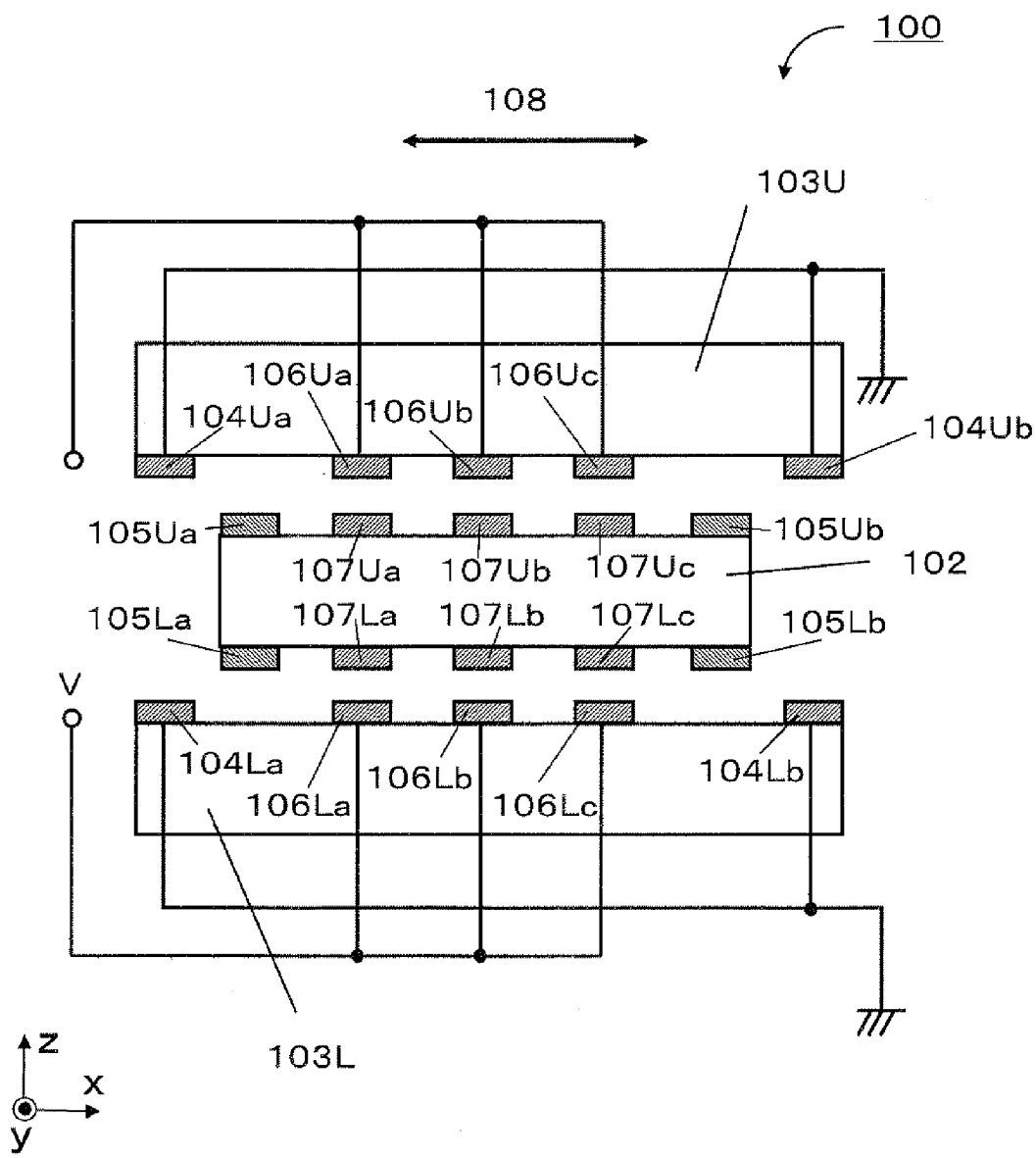
FIG. 1 is a cross sectional view of a vibration power generator according to Embodiment 1 of the present invention.
Figure 2:
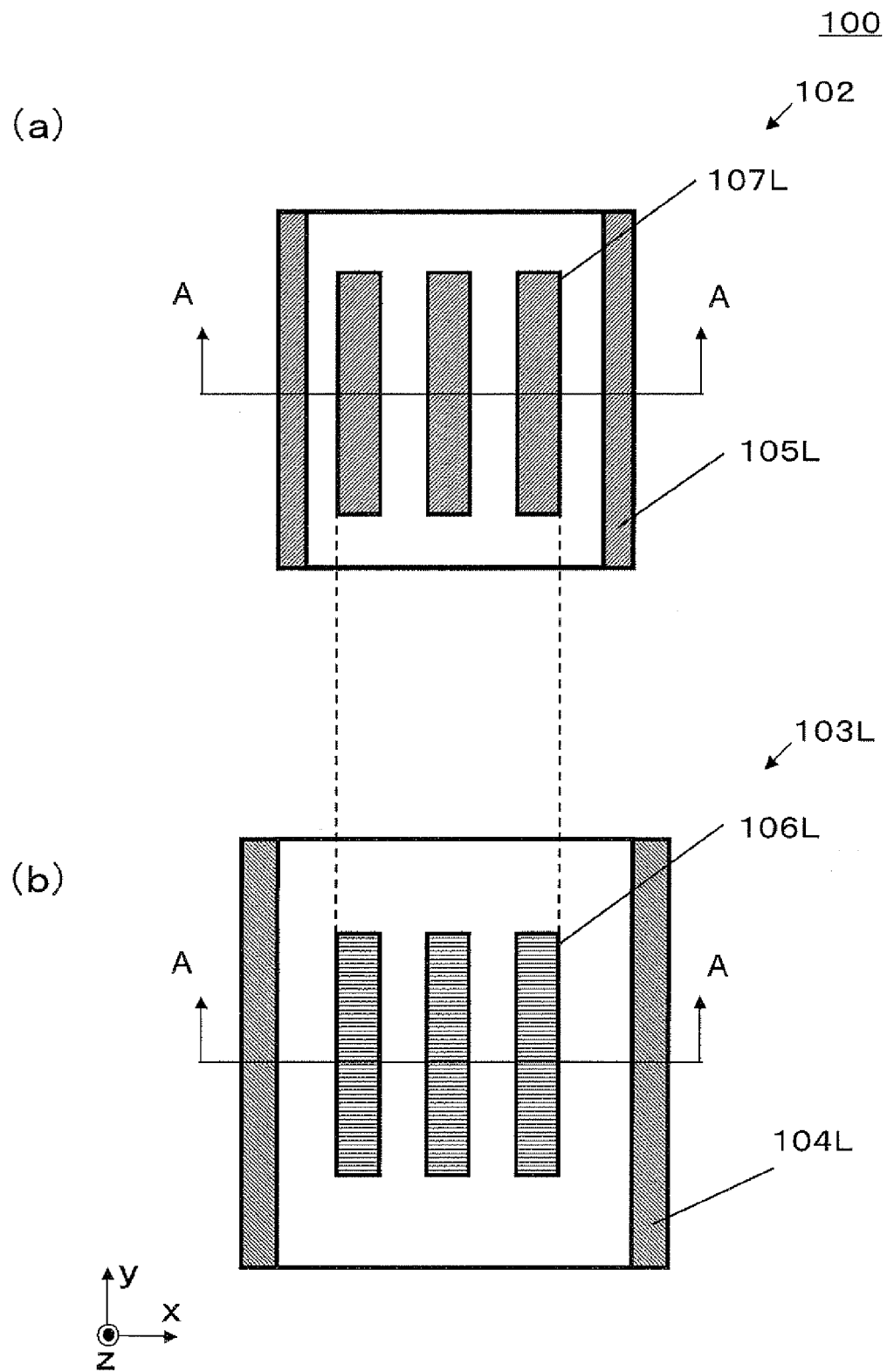
FIG. 2 includes (a) a plane view of a first substrate and (b) a plane view of a second substrate according to Embodiment 1 of the present invention.

FIG. 1 is a cross sectional view of a vibration power generator 100 according to Embodiment 1 of the present invention. FIG. 2 includes plane views of a first substrate 102 (FIG. 2(a)) and a second substrate 103L (FIG. 2(b)) of the vibration power generator 100 of FIG. 1. The cross section of FIG. 1 corresponds to a cross section of FIG. 2 taken along line A-A.

The vibration power generator 100 is composed of a first substrate 102 as a vibratable substrate (i.e., movable substrate), a second substrate 103L opposing to one surface (i.e., lower surface of the first substrate 102 in FIG. 1) of the first substrate 102, and a third substrate opposing to the other surface (i.e., upper surface of the first substrate 102 in FIG. 1) of the first substrate 102.

First electrodes 107La, 107Lb and 107Lc are formed on the one surface (e.g., lower surface of FIG. 1) of the first substrate 102. Third electrodes 107Ua, 107Ub and 107Uc are formed on the other surface (e.g., upper surface in FIG. 1) of the first substrate 102.

Second electrodes 106La, 106Lb and 106Lc are formed on a main surface (e.g., upper surface in FIG. 1) of a second substrate 103L opposing to the one surface of the first substrate 102 at positions correspondingly opposing to the first electrodes 107La, 107Lb, and 107Lc, respectively.

Fourth electrodes 106Ua, 106Ub and 106Uc are formed on a main surface (e.g., lower surface in FIG. 1) of a third substrate 103U opposing to the other surface of the first substrate 102 at positions correspondingly opposing to the third electrodes 107Ua, 107Ub and 107Uc, respectively.

Fifth electrodes 105La and 105Lb are formed on the one surface of the first substrate 102. Seventh electrodes 105Ua and 105Ub are formed on the other surface of the first substrate 102.

Sixth electrodes 104La and 104Lb are formed on the main surface of the second substrate 103L opposing to the one surface of the first substrate 102. Eighth electrodes 104Ua and 104Ub are formed on the main surface of the third substrate 103U opposing to the other surface of the first substrate 102.

The first electrodes 107La, 107Lb and 107Lc, the fifth electrodes 105La and 105Lb, the sixth electrodes 104La and 104Lb, the third electrodes 107Ua, 107Ub and 107Uc, the seventh electrodes 105Ua and 105Ub, and the eighth electrodes 104Ua and 104Ub are electret electrodes including films retaining electric charges.

Preferably, a polarity of the electric charges retained by the films of the fifth electrodes 105L (i.e., polarity of the electric charges retained by the electret electrodes 105L) is identical to a polarity of the electric charges retained by the films of the sixth electrodes 104L (i.e., if one electrodes have a positive polarity, the other electrodes also have a positive polarity, and if one electrodes have a negative polarity, the other electrodes also have a negative polarity) in order to cause an electrostatic repulsion (i.e., repulsion) to act on an area between the fifth electrodes 105L (i.e., 105La, 105Lb) and the sixth electrodes 104L (i.e., 104La, 104Lb).

Preferably, a polarity of the electric charges retained by the films of the first electrodes 107L (i.e., 107La, 107Lb, and 107Lc) is also identical to a polarity of the electric charges retained by the films of the fifth electrodes 105L. As a result of the above, the first electrodes 107L and the fifth electrodes 105L can be charged concurrently, which makes the process simpler.

Similarly, a polarity of the electric charges retained by the films of the seventh electrodes 105U is preferably identical to a polarity of the electric charges retained by the films of the eighth electrodes 104U (i.e., if one electrodes have a positive polarity, the other electrodes also have a positive polarity, and if one electrodes have a negative polarity, the other electrodes also have a negative polarity) in order to cause an electrostatic repulsion (i.e., repulsion) to act on an area between the seventh electrodes 105U (i.e., 105Ua and 105Ub) and the eighth electrodes 104U (i.e., 104Ua and 104Ub).

Further similarly, a polarity of the electric charges retained by the films of the third electrodes 107U (i.e., 107Ua, 107Ub, and 107Uc) is preferably identical to a polarity of the electric charges retained by the films of the seventh electrodes 105U and the eighth electrodes 104U. Accordingly, the third electrodes 107U, the seventh electrodes 105U, and the eighth electrodes 104U can be charged concurrently, which makes the process simpler.

On the other hand, the polarity (i.e., polarity of the electric charges retained by the electret electrodes) of the films of the first electrodes 107L differs from the polarity of the films of the third electrodes 107U, i.e., either one of the first electrodes 107L or the third electrodes 107U has a positive polarity, the other one of the first electrodes 107L or the third electrodes 107U has a negative polarity. This is because, by forming positively charged electrodes and negatively charged electrodes on the upper surface and the lower surface of the first substrate 102, respectively, the first substrate 102 can be substantially treated as a pseudo GND.

Therefore, preferably, the polarity of the electric charges retained by the third electrodes 107U, the seventh electrodes 105U and the eighth electrodes 104U is differentiated from the polarity of the electric charges retained by the first electrodes 107L, the fifth electrodes 105L and the sixth electrodes 104L.

As described above, since the first substrate 102 functions as the pseudo GND, the first substrate 102 can be treated as a substrate which is established on the GND without wiring from the first substrate 102 to be grounded. Therefore, no wiring to the first substrate 102 can be required any more.

More preferably, the GND may be drawn out from the first substrate 102 by using flexible wiring such as a lead wire to establish a ground. This is because, with the configuration that the first substrate 102 is grounded to a reference potential (i.e., GND) in addition to the formation of the pseudo GND surface, more stable potential to be extracted can be achieved.

As described above, in a case where the first substrate 102 is grounded, the wiring can be provided freely according to a connecting position of the lead wire. Also, the wiring can be provided separately, so that the wiring can be simplified in comparison with the wiring from the movably supported substrate of a conventional vibration power generator. With the flexible wiring such as a lead wire, the wiring can be provided without impeding the vibration. As a result thereof, an effect that the vibration of the first substrate 102 is not impeded can be produced.

Although it is not illustrated in FIG. 1, the second substrate 103L and the third substrate 103U are secured, whereas the first substrate 102 is not secured. Therefore, the first substrate 102 is movable in at least either one of a z-axis direction, an x-axis direction and a y-axis direction.

Since the fifth electrodes 105La and 105Lb and the sixth electrodes 104La and 104Lb retain the electric charges of the same polarity, an electrostatic repulsion is exerted on an area between the fifth electrodes 105La and 105Lb and the sixth electrodes 104La and 104Lb. The electrostatic repulsion varies in strength according to a relative position between the first substrate 102 and the second substrate 103L. The electrostatic repulsion can be decomposed to a component in a lateral direction of FIG. 1 (i.e., x-axis direction in FIG. 1) among directions in parallel with a main surface of the second substrate 103L, a component in a vertical direction (i.e., z-axis direction in FIG. 1) vertical to the main surface of the second substrate 103L, and a component in a vertical direction (i.e., y-axis direction in FIG. 1) vertical to a sheet of FIG. 1 among directions in parallel with the main surface of the second substrate 103L.

Similarly, since the seventh electrodes 105Ua and 105Ub and the eighth electrodes 104Ua and 104Ub retain the electric charges having the same polarity, an electrostatic repulsion effects on an area between the seventh electrodes 105Ua and 105Ub and the eighth electrodes 104Ua and 104Ub. The electrostatic repulsion varies in strength according to a relative position between the first substrate 102 and the third substrate 103U. The electrostatic repulsion can be decomposed to a component in a lateral direction of FIG. 1 (i.e., x-axis direction in FIG. 1) among directions in parallel with a main surface of the third substrate 103U, a component in a vertical direction (i.e., z-axis direction in FIG. 1) vertical to the main surface of the third substrate 103U, and a component in a vertical direction (i.e., y-axis direction in FIG. 1) vertical to the sheet of FIG. 1 among directions in parallel with the main surface of the third substrate 103U.

The first substrate 102 is held, via a space, at a position at which the z-axis direction component of the electrostatic repulsion between the third electrodes 105La and 105 Lb and the fourth electrodes 104La and 104Lb, the z-axis direction component of the electrostatic repulsion between the seventh electrodes 105Ua and 105Ub and the eighth electrodes 104Ua and 104Ub, and gravity effecting on the first substrate 102 can be balanced (i.e., held in a floating state in air).

According to the present embodiment, the fifth electrodes 105La and 105Lb and the sixth electrodes 104La and 104Lb, and the seventh electrodes 105Ua and 105Ub and the eighth electrodes 104Ua and 104Ub are disposed such that a force (i.e., restoring force) that the first substrate 102 attempts to return to an original position when the first substrate 102 is moved in at least either one of the x-axis direction or the y-axis direction is generated by at least one of the x-axis direction component or the y-axis direction component of the electrostatic force (i.e., electrostatic repulsion).

In other words, the first substrate 102 is held at a predetermined position in the z-axis direction by the electrostatic force exerted between the fifth electrodes 105La and 105Lb and the sixth electrodes 104La and 104Lb and the electrostatic force exerted between the seventh electrodes 105Ua and 105Ub and the eighth electrodes 104Ua and 104Ub as well as, when no external force is exerted, the substrate 102 is held at a predetermined position also with respect to the x-axis direction and/or the y-axis direction.

As described above, by disposing the fifth electrodes 105La and 105Lb and the sixth electrodes 104La and 104Lb, and the seventh electrodes 105Ua and 105Ub and the eighth electrodes 104Ua and 104Ub, the first substrate 102 can be vibrated in the x-axis direction and/or the y-axis direction without using a mechanical spring.

As a result thereof, an overlapped area between the first electrodes 107L (i.e., 107La, 107Lb and 107Lc) and the second electrodes 106L (i.e., 106La, 106Lb and 106Lc) and an overlapped area between the third electrodes 107U (i.e., 107Ua, 107Ub and 107Uc) and the fourth electrodes 106U (i.e., 106Ua, 106Ub and 106Uc) vary, thereby allowing the vibration power generator 100 to generate electric power.

An arrangement of the electrodes will be described below.

FIG. 2(a) illustrates a lower surface of the first substrate 102 and FIG. 2(b) illustrates an upper surface of the second substrate 103L.

As it is illustrated in FIG. 2(a), the first electrodes 107L (corresponding to 107La, 107Lb and 107Lc of FIG. 1) are composed of a plurality of strip-shaped electrodes disposed such that a longitudinal direction thereof is in parallel with the y-axis. The plurality of electrodes is electrically connected to each other. Similarly, as illustrated in FIG. 2(b), the second electrodes 106L (corresponding to 106La, 106Lb and 106Lc of FIG. 1) are also composed of a plurality of strip-shaped electrodes disposed such that a longitudinal direction thereof is in parallel with the y-axis. The plurality of electrodes is also electrically connected to each other. In FIGS. 2(a) and 2(b), the wiring structure is not illustrated for the sake of simpler description.

Along peripheries (i.e., ends) extending in the y-axis direction of the first substrate 102, 2 pieces of fifth electrodes 105L (corresponding to 105La and 105Lb of FIG. 1) are disposed.

Similarly, along peripheries (i.e., ends) extending in the y-axis direction of the second substrate 103L, 2 pieces of sixth electrodes 104L (corresponding to 104La and 104Lb of FIG. 1) are disposed.

The sixth electrodes 104L are disposed so as to be positioned outside the fifth electrodes 105L in the x-axis direction.

The 2 pieces of fifth electrodes 105L are electrically connected to each other. Further, the 2 pieces of sixth electrodes 106L are electrically connected to each other and grounded.

According to the embodiment illustrated in FIG. 2(a), the fifth electrodes 105L are not disposed along the entire periphery of the first substrate 102 but may be disposed only partially along the peripheries of the first substrate 102, which brings an advantage of a simpler structure. Similarly, according to the embodiment illustrated in FIG. 2(b), the sixth electrodes 104L are not disposed along the entire periphery of the second substrate 103L but may be disposed only partially along the peripheries of the second substrate 103L, which brings an advantage of a simpler structure.

In the embodiments of FIGS. 2(a) and 2(b), the fifth electrodes 105L and the sixth electrodes 104L are disposed over the entire lengths of the peripheries (i.e., ends) extending in the y-axis direction of the corresponding substrates on which the respective electrodes are disposed. However, for example, the fifth electrodes 105L and the sixth electrodes 104L may be disposed only on corners (i.e., 4 corners) of the corresponding substrates or may be disposed only partially, e.g., may be disposed only portions away from the corners of the corresponding substrates.

In the embodiment of FIG. 2, the sixth electrodes 104L are disposed in the x-axis direction so as to be positioned outside the fifth electrodes 105L. However, the fifth electrodes 105L may be disposed so as to be positioned outside the sixth electrodes 104L.

The arrangement of the first electrodes 107L and the arrangement of the fifth electrodes 105L may be applied to an arrangement of the third electrodes 107U and an arrangement of the seventh electrodes 105U on the upper surface of the first substrate 102, respectively.

Similarly, the arrangement of the second electrodes 106L and the arrangement of the sixth electrodes 104L as described above may be applied to an arrangement of the fourth electrodes 106U and an arrangement of the eighth electrodes 104U on the lower surface of the third substrate 103U, respectively.

In a case where the arrangement of the third electrodes 107U and the arrangement of the seventh electrodes 105U are applied to an arrangement of the first electrodes 107L and an arrangement of the fifth electrodes 105L, respectively, and the arrangement of the fourth electrodes 106U and the arrangement of the eighth electrodes 104U are applied to an arrangement of the second electrodes 106L and an arrangement of the sixth electrodes 104L, respectively, no restoring force in the y-axis direction is exerted to the first substrate 102.

Therefore, in order to limit the shifting of the first substrate 102 in the y-axis direction within a predetermined range, it is preferable to provide, for example, a constraining means such as projections provided on the ends of the second substrate 103L in the y-axis direction.

A description will be made below as to an operation of the vibration power generator 100.

As described above, the fifth electrodes 105L and the sixth electrodes 104L retain the electric charges of the same polarity, so that repulsion (i.e., electrostatic repulsion) due to the electrostatic force is exerted between the fifth electrodes 105L and the sixth electrodes 104L. Similarly, the seventh electrodes 105U and the eighth electrodes 104U retain the electric charges of the same polarity, so that repulsion due to the electrostatic force is exerted between the seventh electrodes 105U and the eighth electrodes 104U.

Therefore, if no external force effects on the first substrate 102, the first substrate 102 is held at the predetermined position. More specifically, with respect to the z-axis direction, the first substrate 102 is floatingly remained at a position at which these repulsion forces and the gravity effecting on the first substrate 102 are balanced.

The first substrate 102 remains, with respect to the x-axis direction, at a position at which repulsion exerted between the fifth electrode 105La and the sixth electrode 104La and repulsion exerted between the seventh electrode 105Ua and the eighth electrode 104Ua (i.e., force attempting to move the first substrate 102 in a right direction in FIG. 1) balance repulsion exerted between the fifth electrode 105Lb and the sixth electrode 104Lb and repulsion exerted between the seventh electrode 105Ub and the eighth electrode 104Ub (i.e., force attempting to move the first substrate 102 in a left direction in FIG. 1).

When the vibration (i.e., external force) is applied from the outside, the first substrate 102 is shifted relative to the second substrate 103L and the third substrate 103U. A case where the vibration is applied in the x-axis direction is described below. In a case where the first substrate 102 is shifted to a position of a right side of the position at which the above described repulsion are balanced according to the application of the vibration, the repulsion exerted between the fifth electrode 105Lb and the sixth electrode 104Lb and the repulsion exerted between the seventh electrode 105Ub and the eighth electrode 104Ub become larger than the repulsion exerted between the fifth electrode 105La and the sixth electrode 104La and the repulsion exerted between the seventh electrode 105Ua and the eighth electrode 104Ua. As a result thereof, a force attempting to cause the first substrate 102 to return to a left direction effects on the first substrate 102.

On the other hand, in a case where the first substrate 102 is shifted to the left side of the position at which the repulsion are balanced, a force for causing the first substrate 102 to return to the right direction effects on the first substrate 102. As described above, a force (i.e., restoring force) for attempting to push away the first substrate 102 in a direction reverse to the shifted direction is generated. As a result thereof, the first substrate 102 can be restored to the original position.

The first substrate 102 is shifted relative to the second substrate 103L and the third substrate 103U by using the above described restoring force. As a result thereof, the area at which the first electrodes 107La, 107Lb and 107Lc and the second electrodes 106La, 106Lb and 106Lc overlaps each other and the area at which the third electrodes 107Ua, 107Ub and 107Uc and the fourth electrodes 106Ua, 106Ub and 106Uc overlaps each other increase/decrease.

The increase/decrease of the overlapped areas contributes to increase/decrease of amounts of electric charges to be induced to the second electrodes 106L (i.e., 106La, 106Lb and 106Lc) and the fourth electrodes 106U (i.e., 106Ua, 106Ub and 106Uc) which have no electret. Generation of electric power is performed by extracting the electric charges in the form of the electrical energy. As far as the first substrate 102 continues the vibrating movement in which the first substrate 102 is relatively shifted according to the vibration suffered from the outside and thereafter restored to the original position by the electrostatic force, the increase/decrease of the overlapped areas continues.

According to the vibration power generator 100 of the embodiment of the present invention, the following effects can be produced.

(1) Electrical power can be generated by vibration at low frequencies.

(2) Mechanical reliability improves, whereas mechanical disadvantage decreases.

(3) Larger electric power can be output.

A description will be made in detail with respect to the above (1). Each of the first substrate 102, the second substrate 103L and the third substrate 103U does not have a mechanically elastic structure such as a conventional substrate has, but uses a spring force according to the electrostatic force and is not constrained by resonance frequency which is determined based on a size, a material constant, and the like of the elastic structure. Therefore, the first substrate 102, the second substrate 103L and the third substrate 103U can generate electric power with respect to the vibration at low frequencies.

For the sake of easy understanding, provided that the mass of the first substrate 102 is m, if an assumption is made that a force F=ma is applied according to an accelerated velocity a of the external vibration, the first substrate 102 is shifted by the force F. Unbalance occurs between the left electrostatic force and the right electrostatic force according to the shifted amount. Accordingly, a force to restore the first substrate 102 to the original position comes to be applied. The shifting amount of the first substrate 102 of the vibration power generator 100 exemplified in the present embodiment varies depending on the accelerated velocity and thus electric power can be generated also with respect to the vibration at low frequencies.

A detailed description will be made below with respect to the above (2).

The vibration power generator 100 as exemplified in the present embodiment does not have the mechanically elastic structure as a conventional vibration power generator has. Therefore, to solve a problem of difficulty in down-sizing, the structure is designed with a sufficient room in order to secure reliability to cover an elastic deformation of the elastic structure in the structure, resulting in absence of a portion at which elastic fatigue occurs. As a result thereof, the mechanical reliability of the springs can be secured with ease and, also, the reliability can be secured with ease in a case where the down-sizing and the operation at large-amplitude are realized.

Further, it is not necessary to form the members made of totally different materials such as substrates composed of silicon, glass, and the like and resin springs, so that an advantage that the structure and the process can be simplified is obtained.

The first electrodes 107L (i.e., 107La, 107Lb, and 107Lc) formed on the lower surface of the first substrate 102 retain electric charges having a polarity different from a polarity of the electric charges of the third electrodes 107U (i.e., 107Ua, 107Ub, and 107Uc) formed on the upper surface of the first substrate 102.

Therefore, the third electrodes 107U have a potential different from a potential of the first electrodes 107L, i.e., one electrodes have a potential reverse to a potential of the other electrodes. As a result thereof, the pseudo GND surface appears within the first substrate 102.

As a result thereof, in a case where an arrangement of the first electrodes 107L and the second electrodes 106L is identical to an arrangement of the third electrodes 107U and the fourth electrodes 106U, when the electrical energy is extracted from the opposing electrodes (i.e., second electrodes 106L (i.e., 106La, 106Lb and 106Lc) and the fourth electrodes 106U (i.e., 106Ua, 106Ub and 106Uc)), an electric potential of the electric power extracted from the second electrodes 106L has a reverse phase from an electric potential of the electric power extracted from the fourth electrodes 106U.

Preferably, the first substrate is configured such that the GND is drawn out from the first substrate by using a flexible wire such as a lead wire to establish a ground. This is because the electric potential to be extracted can be stabilized by grounding the first substrate 102 on the reference potential (i.e., GND) in addition to the formation of the pseudo GND surface.

A detailed description will be made below as to the above (3).

The vibration power generator of the present embodiment can extract the electrical energy as a voltage of the reverse phase by using 2 pairs of opposing electrodes as described above (i.e., the first electrodes 107L and the second electrodes 106L, and the third electrodes 107U and the fourth electrodes 106U). More specifically, in comparison with a conventional vibration power generator having a configuration in which the electrodes are formed only on one side of the first substrate, the vibration power generator of the present embodiment can obtain twice as much electric power while, similarly, the first substrate vibrates once.

(Electret Electrode)

An electrode (i.e., electret electrode) which contains a film retaining electric charge to be used in Embodiment 1 is described below in detail.

Figure 3:
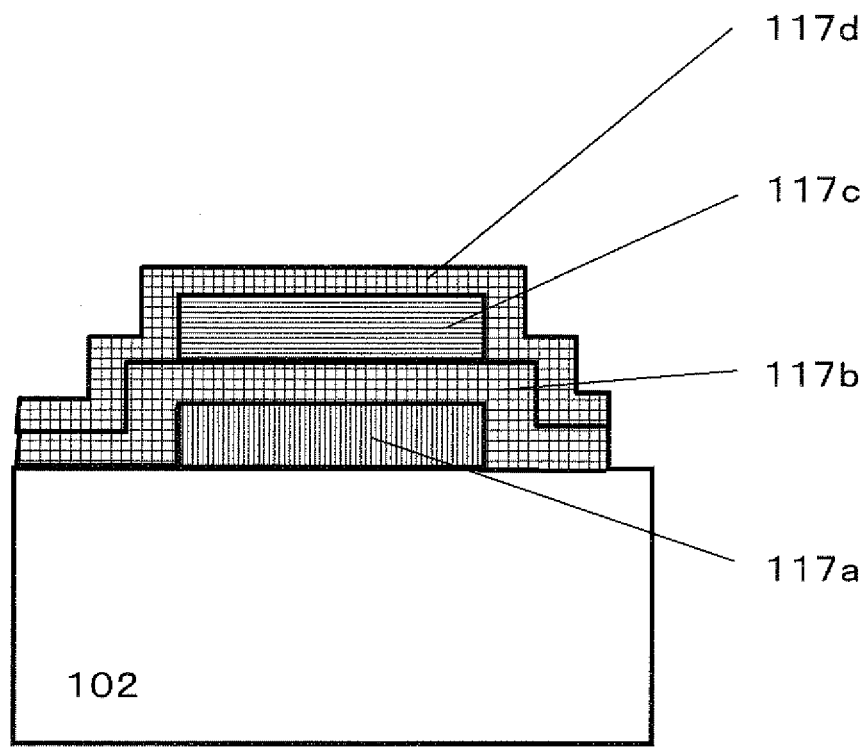
FIG. 3 is a cross sectional view of an electret electrode according to Embodiment 1 of the present invention.

FIG. 3 is a cross sectional view illustrating an electret electrode which can be used as any one of the first electrodes 107La, 107Lb and 107Lc, the fifth electrodes 105La and 105Lb, the sixth electrodes 104La and 104Lb, third electrodes 107Ua, 107Ub and 107Uc, the seventh electrodes 105Ua and 105Ub, and the eighth electrodes 104Ua and 104Ub.

The third electrodes 107U (i.e., 107Ua, 107Ub and 107Uc) are exemplified here; however, needless to say, the other electrodes also can have the same configuration on the corresponding substrates, respectively.

A conductive material 117a is formed on the first substrate 102. A first insulating material 117b, an electret 117c as a film retaining electric charges and a second insulating material 117d are formed on the conductive material 117a.

The conductive material 117a of each of the third electrodes 107Ua, 107Ub and 107Uc is electrically connected to each other.

The electret 117c may be formed over the entire conductive material 117a, or may be disposed only partially on the strip-shaped conductive material 117a. Preferably, the electret 117c is formed partially on the strip-shaped conductive material 117a in view of the stability of the process and the device characteristics.

It is preferable to use a high resistance substrate as the first substrate 102. In this case, it is desirable that the electret 117c is formed only on the conductive material 117a. With this configuration, upon injection of the electric charges, the electric charges can be forcibly injected into the electret 117c, so that an electret more stable in the electric charges can be formed.

The high resistance substrate here includes not only a substrate having a high resistivity over the entire substrate but also a substrate having a low resistivity (e.g., silicon substrate having a low resistance) on which surface is provided with an insulating film such as an oxide film formed thereon. The effect that can be produced with the former substrate can also be produced even with the latter substrate.

A description will be made as to an electret material to be used for the electret 117c.

As described above, the first electrodes 107L, the fifth electrodes 105L, the sixth electrodes 104L, the third electrodes 107U, the seventh electrodes 105U and the eighth electrodes 104U are formed into electret electrodes having electret films retaining the electric charges.

Examples of the electret material composing the electret film 117c include polymeric materials such as polypropylene, polyethylene terephthalate and polyvinyl chloride, or inorganic materials such as silicon oxide. The silicon oxide is preferred to be used among them since it is excellent in dielectric strength voltage and heat resistance.

To improve a humidity resistance, it is preferable to completely cover the periphery of the silicon oxide as an electric charge retaining film with an insulating film such as a silicon nitride film. For example, in a case where the silicon oxide is used, the electret 117c excellent in dielectric strength voltage, heat resistance and humidity resistance can be obtained by employing a configuration to completely cover the periphery of the silicon oxide with the insulating film such as a silicon nitride film.

In the present embodiment, a case where the first electrodes 107L and the third electrodes 107U retain the electric charges having different polarities is exemplified. However, the vibration power generator 100 can generate electric power, even in a case where the third electrodes 107U and the first electrodes 107L retain the electric charges having the same polarity, by grounding the third electrodes 107U and the first electrodes 107L with an electrically extracting means such as a lead wire extending from the first substrate 102. In this case, the electric power is output in the form of an electric potential of the same phase (i.e., electric charge of the same polarity) from the second electrodes 106L and the fourth electrodes 106U, so that the generated electric power can be extracted by wiring with the common output terminals.

As described above, by causing the first electrodes 107L and the third electrodes 107U to have the same polarity, the electric charges retained by all of the first electrodes 107L, the fifth electrodes 105L, the sixth electrodes 104L, the third electrodes 107U, the seventh electrodes 105U and the eighth electrodes 104U as the electret electrodes can have the same polarity. As a result thereof, all the electrodes can be charged concurrently upon manufacturing thereof, which advantageously simplifies the manufacturing process.

Further, in the present embodiment, a case where, with respect to the electrodes disposed opposing to each other to contribute to the power generation, the first electrodes 107La, 107Lb and 107Lc and the third electrodes 107Ua, 107Ub and 107Uc are electret electrodes retaining the electric charges and the second electrodes 106La, 106Lb and 106Lc and the fourth electrodes 106Ua, 106Ub and 106Uc are normal electrodes which do not include the electrets is exemplified.

However, the second electrodes 106La, 106Lb and 106Lc and the fourth electrodes 106Ua, 106Ub and 106Uc may be electret electrodes and the first electrodes 107La, 107Lb and 107Lc and the third electrodes 107Ua, 107Ub and 107Uc may be normal electrodes. In this case, also, needless to say, a similar effect can be produced in generating electric power.

Although it is not illustrated in FIGS. 1, 2 and 3, the first insulating material 117b and the second insulating material 117d are configured such that the conductive material 117a can be electrically connected to an external terminal. The first insulating material 117b and the second insulating material 117d may be configured so as to cover at least the electret 117. It is not necessary to cause the first insulating material 117b and the second insulating material 117d to cover the entire substrate.

In the embodiment of FIG. 2, the second electrodes 106La, 106Lb and 106Lc are formed only on portions opposing to the first electrodes 107La, 107Lb and 107Lc; however, preferably, are formed on an area beyond the first electrodes 107L (i.e., up to an area outside the first electrodes 107L (i.e., first electrodes 107La and 107Lc)). More preferably, the second electrodes 106U are formed up to a vibration limit (i.e., up to a range in which the first substrate 102 can be shifted according to the vibration) of the first substrate 102 (more specifically, the first electrodes 107L).

Similarly, it is preferable that the fourth electrodes 106U are formed up to an area beyond the third electrodes 107U (i.e., up to an area outside the third electrodes 107U (i.e., third electrodes 107Ua and 107Uc)). More preferably, the fourth electrodes 106U are formed up to the vibration limit (i.e., up to a range in which the first substrate 102 can be shifted according to the vibration) of the first substrate 102 (more specifically, the third electrodes 107U).

With the above configuration, the following effect can be produced.

(4) Increase/decrease of the overlapped area can be made constant.

If the second electrodes 106L are formed only at positions approximately opposing to the first electrodes 107L in a resting state, in a case where the first substrate 102 vibrates at a large amplitude (i.e., large shifting), problems that a time period that the first electrodes 107L (specifically, the first electrodes 107La and 107Lc which are positioned at ends) and the second electrodes 106L are not overlapped to each other increases and that the increase/decrease amount of the overlapped area decreases occur.

The above problems also occur in a case where the fourth electrodes 106U are formed only at positions approximately opposing to the third electrodes 107U in a resting state and the first substrate 102 is vibrated at large amplitude (i.e., a large shifting).

However, by forming the second electrodes 106L so as to be larger than the area of the first electrodes 107L (i.e., by forming the second electrodes 106L up to an area outside the first electrodes 107L), increase/decrease of the overlapped area can be prevented from being decreased and thus the increase/decrease of the overlapped area can be kept constant. In other words, a generating amount of electric power generated by the vibration power generator 100 can be stabilized.

In a case where the fourth electrodes 106U are formed beyond the area of the third electrodes 107U (i.e., formed up to an area outside the third electrodes 107U), the same effect can be produced.

In the above described configurations of the second electrodes 106L and the fourth electrodes 106U, specifically, alike the configuration using the electrostatic force according to the present embodiment, the amplitude of the first substrate 102 can be made larger and thus a good effect can be produced in the vibration power generator in which the first substrate 102 vibrates beyond the widths of the second electrodes 106L or the fourth electrodes 106U (e.g., width of each electrode such as the second electrode 102La).

The surface (i.e., main surface) of the first substrate 102 may be formed into a rectangular shape or any other shape other than the square shape of FIG. 2. Regardless of the shape, it is needless to say, a similar effect can be produced with the arrangement of the power generation electrodes (i.e., first electrodes 107L and the third electrodes 107U) and the arrangement of the electrostatic force generating electrodes (i.e., fifth electrodes 105L and the seventh electrodes 105U) according to the present embodiment.

In the embodiment of FIG. 1, the second substrate 103L and the third substrate 103U are configured to be secured and thus do not vibrates. However, either one of or both of the second substrate 103L and the third substrate 103U can be configured to be vibratable (i.e., movable) without being secured in a manner as the first substrate 102.

In the embodiment of FIG. 1, the vibration power generator 100 as described above applies the restoring force to the first substrate 102 by using the electrostatic force between the fifth electrodes 105L (i.e., 105La and 105Lb) and the sixth electrodes 104L (i.e., 104La and 104Lb) and the electrostatic force between the seventh electrodes 105U (i.e., 105Ua and 105Ub) and the eighth electrodes 104U (i.e., 104Ua and 104Ub). As described above, by causing the restoring force to effect on both of the upper surface side and the lower surface side of the first substrate 102, the restoring force in a planer direction is applied as well as only one of upward or downward application of a force can be avoided to allow the stable movement of the first substrate 102.

However, the vibration power generator 100 can generate electric power by causing the electrostatic force to effect only on the lower surface of the first substrate 102 with the fifth electrodes 105L (i.e., 105La and 105Lb) and the sixth electrodes 104L (i.e., 104La and 104Lb) being provided but, for example, without being provided with the seventh electrodes 105U (i.e., 105Ua and 105Ub) and the eighth electrodes 104U (i.e., 104Ua and 104Ub).

Such an embodiment in which the electrodes generating the restoring force is provided only on one side of the first substrate 102 is also, of course, included in the present embodiment.

—Variation—

Figure 4:
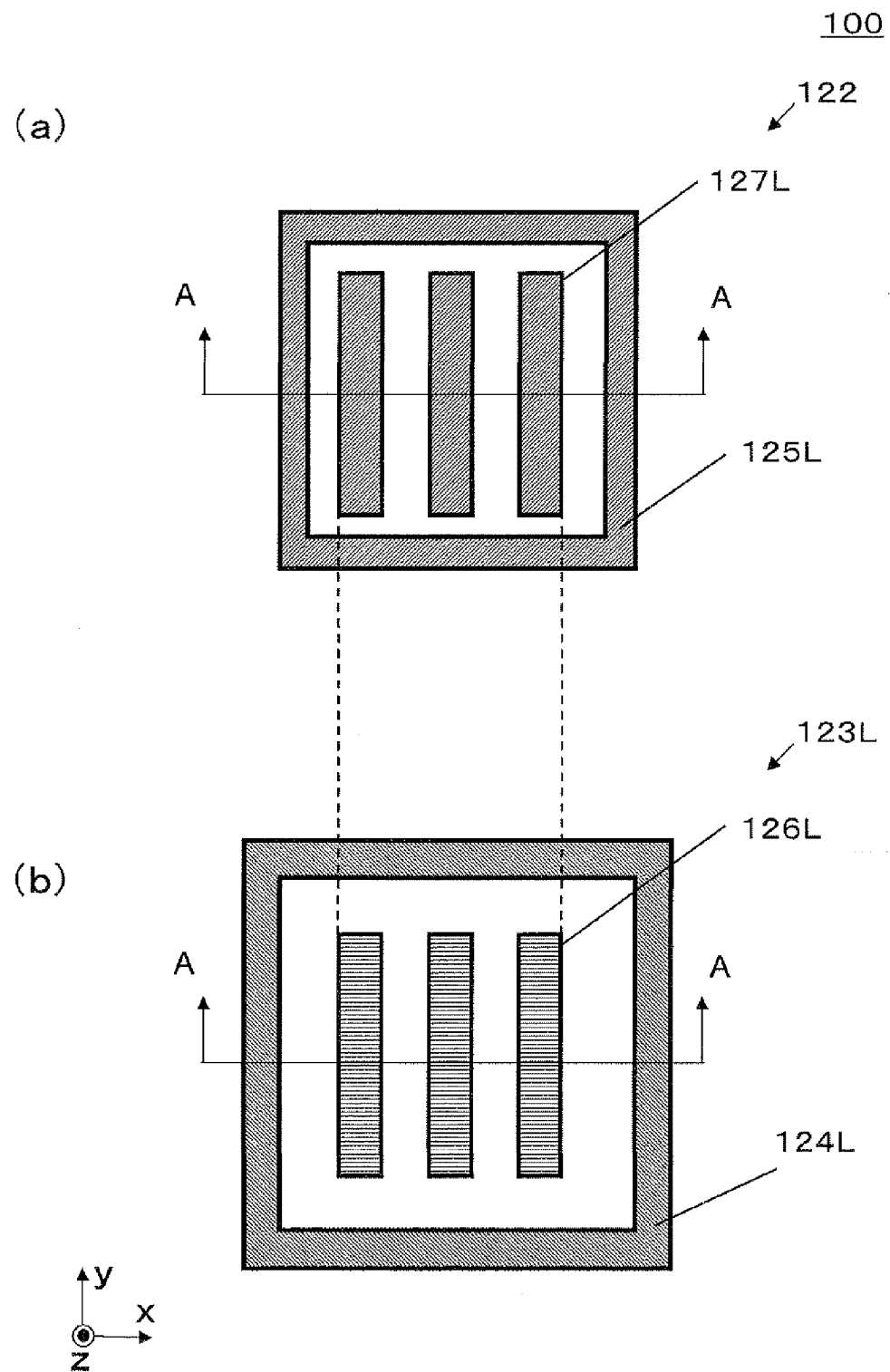
FIG. 4 includes plane views of the first substrate and the second substrate illustrating another configuration according to the Embodiment 1 of the present invention.

FIG. 4 shows plane views of a lower surface of a first substrate 122 (FIG. 4(a)) and a second substrate 123L (FIG. 4(b)) according to a variation of the present embodiment.

The present variation differs from the first substrate 102 of FIG. 2 in that the fifth electrodes 105L are disposed only on portions of the peripheries of the substrate extending in the y-axis direction, whereas the fifth electrode (i.e., electret electrode) 125L is disposed along entire periphery along an end (i.e., an outer circumferential portion) of the first substrate 122 in the variation.

Similarly, a second substrate 123L is also different from the second substrate 103L of FIG. 2 in that a sixth electrode (i.e., electret electrode) 124L is disposed entire periphery along an end (i.e., the entire outer circumferential portion) of the second substrate 123L.

Portions of the first substrate 122 other than the fifth electrode 125L are identical to the portions of the first substrate 102. For example, first electrodes 127L may be configured to be identical to those of the above described first electrodes 107L. Similarly, portions of the second substrate 123L other than the portion of the sixth electrode 124L may be identical to those of the second substrate 103L. For example, second electrodes 126L may be configured to be identical to the above described second electrodes 106L.

The sixth electrode 124L on the second substrate 123L is disposed so as to be positioned outside the fifth electrode 125L on the first substrate 122. Since the sixth electrode 124L is an electret electrode having a polarity identical to that of the fifth electrode 125L, an electrostatic repulsion occurs between the sixth electrode 124L and the fifth electrode 125L. The electrostatic repulsion occurs in the y-axis direction in addition to the x-axis direction and the z-axis direction.

In other words, in the present variation, the restoring force effecting on the first substrate 122 effects in the y-axis direction in addition to the x-axis direction and the z-axis direction similar to the embodiment of FIG. 1. As a result thereof, since a force for restoring the first substrate 122 to a predetermined position is generated even if the first substrate 122 is shifted to a direction other than the x-axis direction, e.g., in the y-axis direction, by an external force, an effect of more stable operation of the vibration power generator can be produced.

To securely obtain the above effect, the seventh electrode to be disposed on the upper surface of the first substrate 122 is preferably configured to be identical to the third electrode 125L and the eighth electrode to be disposed on the lower surface of the third substrate 103U is preferably configured to be identical to the fourth electrode 124L.

In the embodiment of FIG. 4, the sixth electrode 124L is disposed so as to be positioned outside the fifth electrode 125L. However, the fifth electrode 125L may also be disposed so as to be positioned outside the sixth electrode 124L.

2. Embodiment 2

Figure 5:
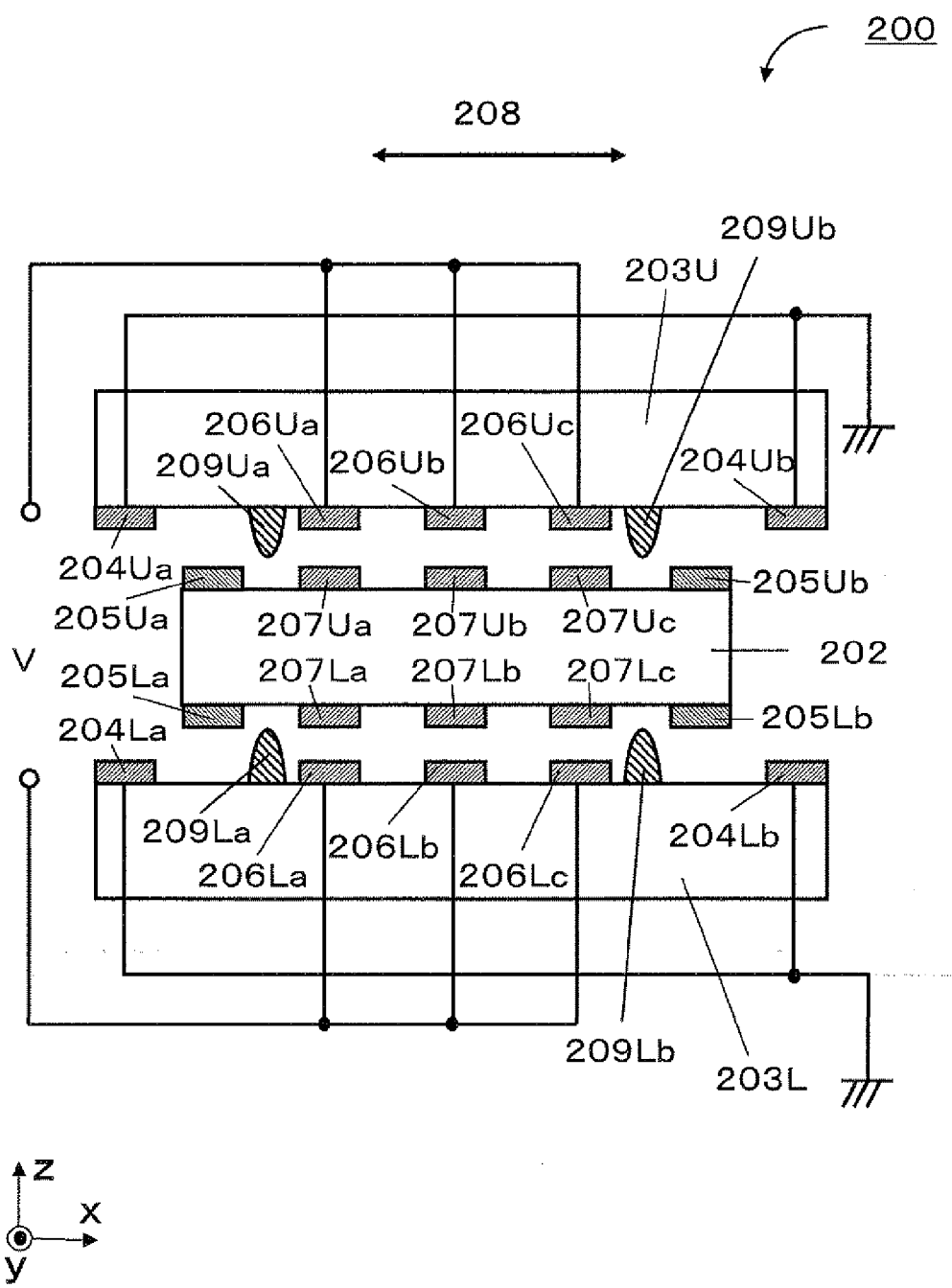
FIG. 5 is a cross sectional view of a vibration power generator according to Embodiment 2 of the present invention.

FIG. 5 is a cross sectional view of a vibration power generator 200 according to Embodiment 2 of the present invention. Embodiment 2 differs from the Embodiment 1 in that projections 209La, 209Lb, 209Ua and 209Ub are formed between the first substrate 202 and the second substrate 203L and between the first substrate 202 and the third substrate 203U, respectively.

In FIG. 5, each component is provided with a symbol together with a number of 200s in order to clarify that each component is the one according to the present embodiment. Unless otherwise noted, each component may be identical to the corresponding component of Embodiment 1 indicated by the same symbol except for the number of 100s.

In other words, the first electrodes 207L (i.e., 207La, 207Lb and 207Lc) have a polarity identical to a polarity of the third electrodes 207U (i.e., 207Ua, 207Ub and 207Uc).

Accordingly, wiring of the first substrate 202 can be omitted or simplified as similar to Embodiment 1.

The projections 209La, 209Lb, 209Ua and 209Ub are secured to one of the second substrate 203L and the third substrate 203U at one ends of the projections and are left free at the other ends of the projections so that the free ends can contact the first substrate 202. Alternatively, the projections 209La, 209Lb, 209Ua and 209Ub are secured to the first substrate 202 at one ends of the projections and are left free at the other ends of the projections so that the other ends can contact one of the second substrate 203L and third substrate 203U.

In the embodiment of FIG. 5, the projections 209La and 209Lb are secured to the second substrate 203L at one ends (i.e., lower ends) of the projections and are left free at the other ends (i.e., upper ends) of the projections so that the other ends (i.e., upper ends) can contact the lower surface of the first substrate 202. On the other hands, the projections 209Ua and 209Ub are secured to the third substrate 203U at one ends (i.e., upper ends) of the projections and are left free at the other ends (i.e., lower ends) of the projections so that the other ends (i.e., lower ends) can contact the upper surface of the first substrate 202.

The projections 209La, 209Lb, 209Ua and 209Ub contribute to a better avoidance of stiction.

An operation of the vibration power generator 200 is described below.

The vibration power generator 200 generates electric power such that the first substrate 202 is shifted (in a direction of an arrow 208 in FIG. 5) with respect to the second substrate 203L and the third substrate 203U by the vibration suffered from the outside. At the time, the first substrate 202 is returned to the predetermined position by the electrostatic force after being shifted by the vibration suffered from the outside.

A case where the first electrodes 207La, 207Lb and 207Lc, the fifth electrodes 205La and 205Lb, and the sixth electrodes 204La and 204Lc are electret electrodes retaining the electric charges having the same polarity and the third electrodes 207Ua, 207Ub and 207Uc, the seventh electrodes 205Ua and 205Ub, and the eighth electrodes 204Ua and 204Uc are electret electrodes retaining the electric charges having the same polarity is exemplified below.

In a case where the first substrate 202 is shifted, the electrostatic force at a side opposite to a direction the first substrate 202 is shifted becomes weaker.

In a case where the first substrate 202 is shifted to, for example, right in FIG. 5, the electrostatic repulsion between the fifth electrode 205Lb and the fourth electrode 204Lb and the electrostatic repulsion between the seventh electrode 205Ub and the eighth electrode 204Ub become stronger than the electrostatic repulsion between the third electrode 205La and the fourth electrode 204La and the electrostatic repulsion between the seventh electrode 205Ua and the eighth electrode 204Ua.

The above phenomenon is considered in view of a component of the electrostatic repulsion in the x-axis direction. That means that a restoring force for retaining the first substrate 202 to the left, i.e., to the original position, works.

On the other hand, the above phenomenon is considered in view of a component of the electrostatic repulsion in the z-axis direction. That means that different electrostatic repulsion which attempts to keep the first substrate 202 in the z-axis direction works at a right side of the first substrate 202 and at a left side of the first substrate 202. More specifically, that means that the shifting in the z-axis direction sometimes becomes unstable.

In view of the above, in the present embodiment, the projections 209La, 209Lb, 209Ua and 209Ub are provided to control the first substrate 202 such that the shifting of the first substrate 202 in the z-axis direction is constrained within a predetermined range. Accordingly, more stable operation of the first substrate 202 can be realized by the projections.

With the above configuration, the following effect can be produced.

(5) More stable operation of the first substrate can be achieved.

Further description will be made below as to the above (5).

As it is already described in the description of the operation of the present embodiment, the projections 209La, 209Lb, 209Ua and 209Ub are configured to hold the first substrate 202. As a result thereof, the first substrate 202 can be operated more stably even if unbalance of the electrostatic force occurs between the shifting direction of the first substrate 202 and the reversely shifting direction thereof, i.e., a direction opposite to the shifting direction of the first substrate 202, when the first substrate 202 is shifted.

Specifically, the vibration power generator which is operable at large amplitude according to the present invention can shift the first substrate largely and, as the shifting becomes larger, the unbalance of the electrostatic force tends to occur between one end side and the other end side (e.g., a right side and a left side in FIG. 5) of the first substrate.

Then, when a tilting of the first substrate occurs due to the unbalance of the electrostatic force, unbalance also occurs in application of the force in an up-and-down direction. Therefore, in some cases, the unbalance is to be corrected. However, if the electrostatic force is made larger in order to correct the unbalance, the restoring force in the x-axis direction becomes too much larger and thus a problem that the first substrate would not be satisfactory shifted by the external vibration may arise.

However, in the present embodiment, the shifting of the first substrate 202 in the z-axis direction is constrained (controlled) with thus provided projections 209La, 209Lb, 209Ua and 209Ub, thereby preventing the occurrence of the tilting. As a result thereof, an applicable field of the vibration power generator having the substrate capable of shifting largely can be expanded.

In the present embodiment, it is preferable to form the second electrodes 206L up to an area beyond the area of the first electrodes 207L (i.e., up to an area outside the first electrodes 207L (i.e., first electrodes 207La and 207Lc)). More preferably, the second electrodes 206L are formed up to the vibration limit (i.e., range in which the first substrate 202 can be shifted according to the vibration) of the first substrate 202 (especially, first electrodes 207L).

Similarly, it is preferable that the fourth electrodes 206U are formed up to an area beyond the third electrodes 207U (i.e. up to an area outside the third electrodes 207U (i.e., third electrodes 207Ua and 207Uc). More preferably, the fourth electrodes 206U are formed up to the vibration limit (i.e., range in which the first substrate 202 can be shifted according to the vibration) of the first substrate 202 (specifically, of the third electrodes 207U).

The projections 209La, 209Lb, 209Ua and 209Ub may be made of an insulating material or a semiconductor material. The projections 209La, 209Lb, 209Ua and 209Ub may be made of a material including a conductive material. In this case, the projections may be electrically connected to the electrodes on the first substrate 202 to be used in extraction of the electrodes. For example, the projections can also be used in grounding the first electrodes 207La, 207Lb and 207Lc and/or the third electrodes 207Ua, 207Ub and 207Uc.

In the embodiment illustrated in FIG. 5, the projections 209La, 209Lb, 209Ua and 209Ub are provided on both of an area between the first substrate 202 and the second substrate 203L (i.e., below the first substrate 202) and an area between the first substrate 202 and the third substrate 203U (i.e., above the first substrate 202). This is preferable as an embodiment because the first substrate 202 vibrates stably without being tilted even when the first substrate 202 is shifted more largely.

Preferably, a plurality of, more preferably, more than 3, sets of projections 209La and 209Lb or the projections 209Ua and 209Ub are formed. This is because the first substrate 202 can be vibrated more stably.

In the embodiment illustrated in FIG. 5, the projections 209La and 209Lb and the projections 209Ua and 209Ub have a convex shape in which a diameter thereof becomes thinner from the second substrate 203L or the third substrate 203U toward the first substrate 202. However, the shape of the projections is not limited thereto but may be any other shapes such as a triangular pyramid shape, a triangle pole shape, and a circular cylinder shape.

3. Embodiment 3

Figure 6:
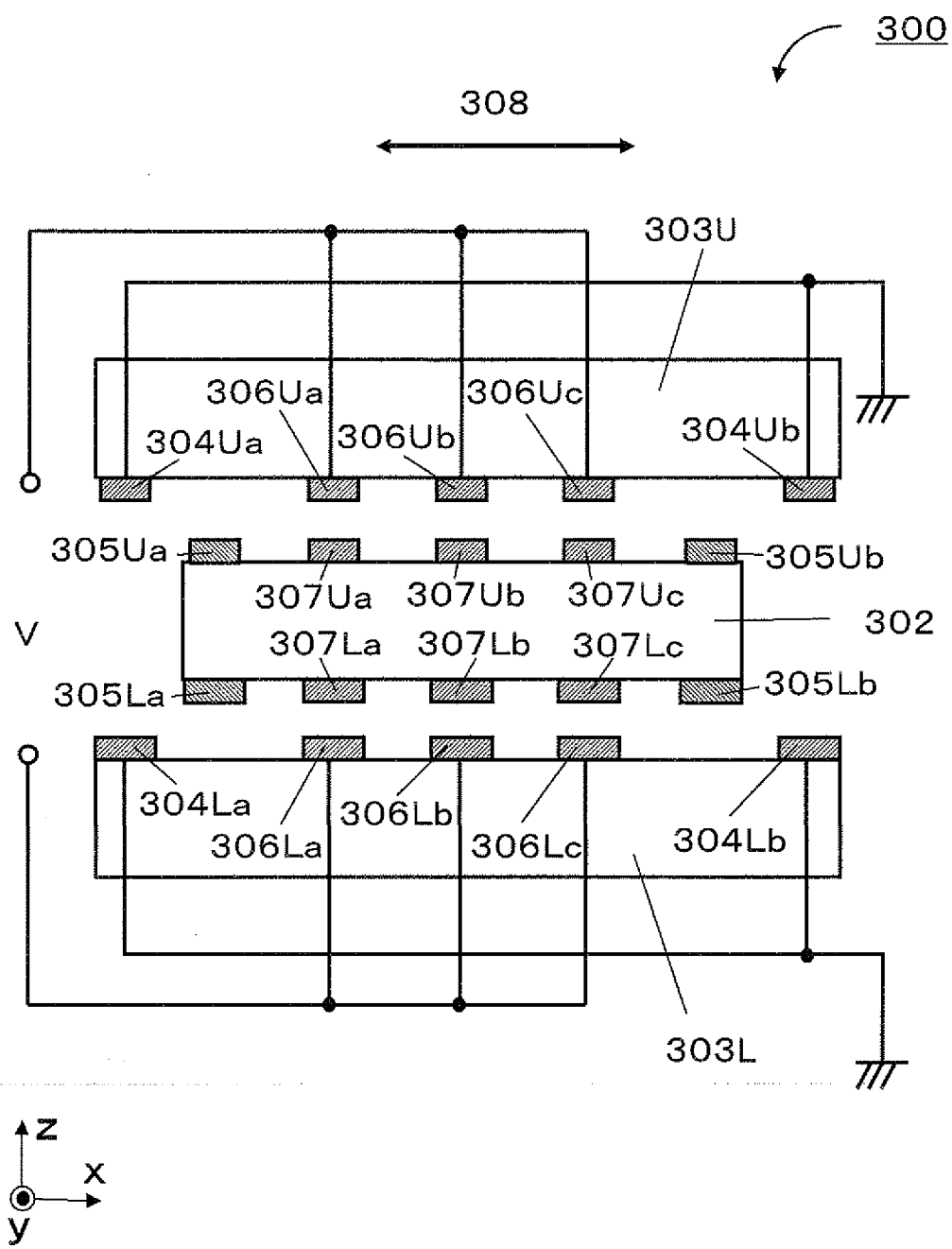
FIG. 6 includes (a) across sectional view of the vibration power generator and (b) a cross sectional view illustrating a configuration of fifth electrodes according to Embodiment 3 of the present invention.

FIG. 6 is a cross sectional view of a vibration power generator 300 according to Embodiment 3 of the present invention. Embodiment 3 differs from Embodiment 1 in that the first electrodes 307La, 307L and 307Lc differ in size from the third electrodes 307Ua, 307Ub and 307Uc, the fifth electrodes 305La and 305Lb and the sixth electrodes 304La and 304Lb differ in size from the seventh electrodes 305Ua and 305Ub and the eighth electrodes 304Ua and 504Ub, respectively.

Configurations other than the above are similar to the configurations of Embodiment 1.

Each component of FIG. 6 is provided with a symbol with a number of 300s in order to clarify that the component is the one according to the present embodiment. Unless otherwise noted, each component may be identical to the corresponding component of Embodiment 1 having the same symbol other than the number of 100s.

With the above described configuration of the vibration power generator 300, the following effect can be produced.

(6) Unbalance of an amount of electric charge is corrected.

A description will be made below as to the above described (6).

Each of the first electrodes 307La, 307Lb and 307Lc, the fifth electrodes 305La and 305Lb, and the sixth electrodes 304La and 304Lb retain the electric charges having the same polarity. Further, each of the third electrodes 307Ua, 307Ub and 307Uc, the seventh electrodes 305Ua and 305Ub and the eighth electrodes 304Ua and 304Ub retain the electric charges having the same polarity. On the other hand, the electric charges retained by the first electrodes 307La, 307Lb and 307Lc, the fifth electrodes 305La and 305Lb and the sixth electrodes 304La and 304Lb have a polarity different from a polarity of the electric charges of the third electrodes 307Ua, 307Ub and 307Uc, the seventh electrodes 305Ua and 305Ub and the eighth electrodes 304Ua and 304Ub.

Even in a case where sizes of the electret electrodes, more specifically, sizes of the electrets retaining the electric charges, are the same, amounts of electric charges which can be retained by the electret electrodes differ from each other if the polarities of the electric charges to be retained are different from each other. Therefore, if the electrodes having different polarities are formed into the same size (more specifically, if volumes of the electrets of the electrodes are formed into the same size), the amounts of the electric charges that can be retained by the electrodes differ from each other, thereby inviting the unbalance in the electrostatic force and an amount of electric power to be generated.

As described in the present embodiment, by changing the sizes of the electrodes (i.e., volumes of the electrets retaining the electric charges) such that the electrostatic forces occurring in the first substrate 302 are substantially equalized between the upper electrodes and the lower electrodes of the first substrate 302, the unbalance of the amounts of electric charges can be corrected and thus no unbalance occurs in an amount of generated power.

In addition, the change of sizes of the electrodes formed on the upper surface and the lower surface of the first substrate 302 enables an easy discrimination of the up-and-down orientation of the substrate. Accordingly, a large effect can be produced in the manufacturing process, e.g., mistakes in the course of the manufacturing process can be prevented.

In the present embodiment, it is preferable that the second electrodes 306L are formed up to an area beyond the first electrodes 307L (i.e., up to an area outside the first electrodes 307L (i.e., first electrodes 307La and 307Lc)). More preferably, the second electrodes 306L are formed up to the vibration limit (i.e., a range in which the first substrate can be shifted according to the vibration) of the first substrate 302 (i.e., more specifically, of the first electrodes 307L).

Similarly, preferably, the fourth electrodes 306U are formed on an area beyond the third electrodes 307U (i.e., up to an area outside the third electrodes 307U (i.e., third electrodes 307Ua and 307Uc)). More preferably, the fourth electrodes 306U are formed up to the vibration limit (i.e., range in which the first substrate can be shifted according to the vibration) of the first substrate 202 (more specifically, of the third electrodes 307U).

4. Embodiment 4

Figure 7:
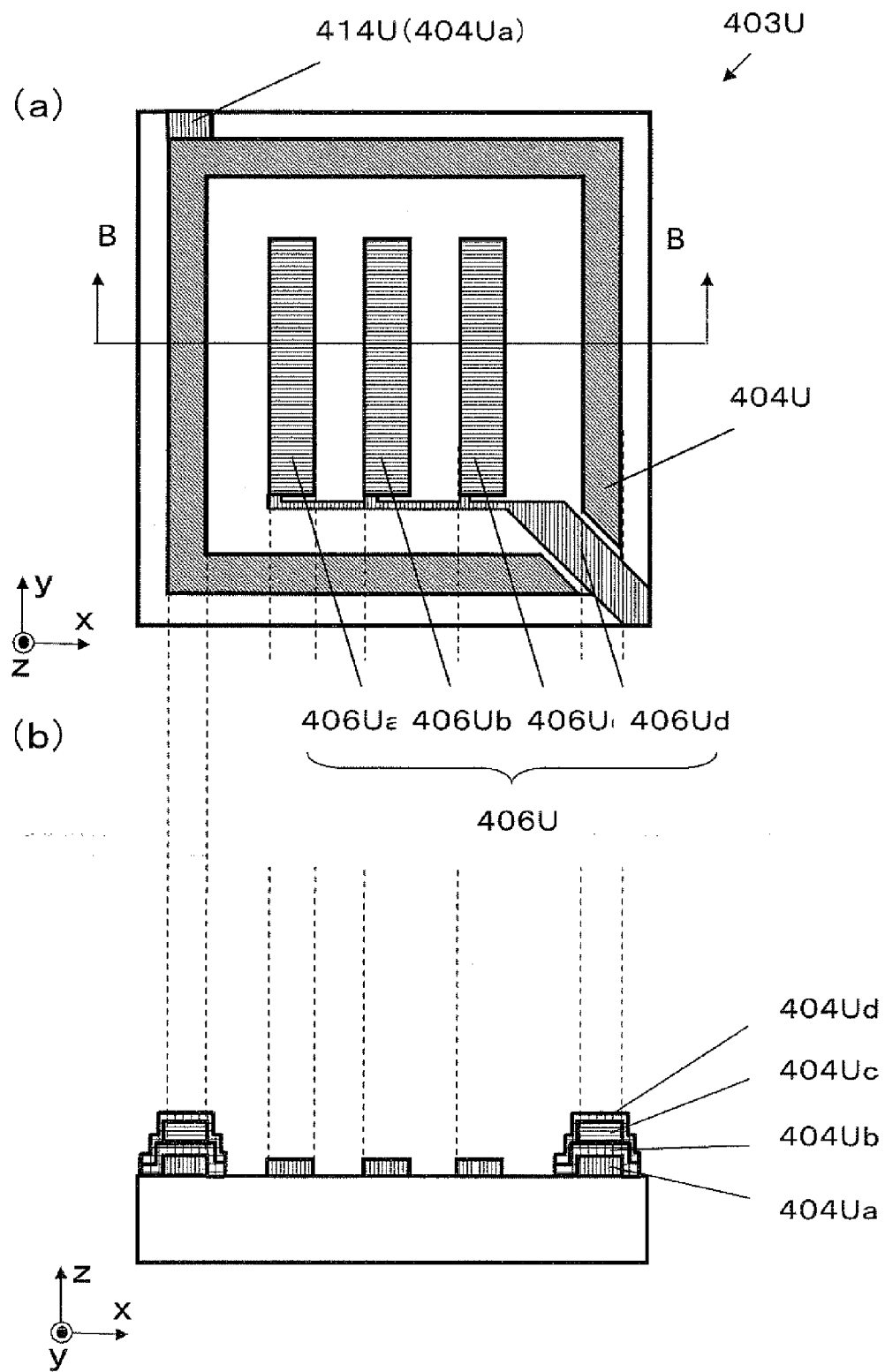
FIG. 7 includes (a) a plane view of the third substrate of the vibration power generator and (b) a cross sectional view of the above (a) taken along line B-B according to Embodiment 4 of the present invention.

FIG. 7 includes a plane view of a third substrate 403U (FIG. 7(a)) and a cross sectional view of the third substrate 403U of FIG. 7(a) taken along line B-B (FIG. 7(b)), respectively, according to Embodiment 4 of the present invention.

In FIG. 7, the third substrate 403U is provided with an eighth electrode 404U along a periphery of the third substrate 403U. Fourth electrodes 406U are formed on the third substrate 403U. More specifically, although it is not illustrated in FIG. 7, the fourth electrodes 406Ua, 406Ub and 406Uc are formed at positions opposing to the third electrodes and electrically connected via a wiring electrode 406Ud. At the time, the eighth electrode 404U is partially provided with a notch such that the extraction with the outside is performed at least one of the four corners of the third substrate 403U.

With respect to the electrical connection, the eighth electrode 404U is grounded via an electrode 414U (i.e., 404Ua).

Here, the eighth electrode 404U is composed of, as similar to FIG. 3, the conductive material 404a, the first insulating material 404b, the electret 404c retaining the electric charges, and the second insulating material 404d.

An operation of the vibration power generator including the third substrate 403U is identical to those of the other embodiments.

With the above configuration of the third substrate 403U, the following effect can be produced.

(7) An effect of the electrostatic force exerted on the spring force can be minimized.

A description will be made below as to the above described (7). In the present embodiment, the extraction from the eighth electrodes 406U is performed at a corner of the third substrate 403U.

Accordingly, even if the first substrate is shifted in the x-axis direction or the y-axis direction, the first substrate can be returned to the original position without harming the electrostatic force by the eighth electrode 404U disposed along the periphery of the third substrate 403U.

In a case where the first substrate is shifted in an angled direction (e.g., in a direction shifting by 45° from the x-axis and the y-axis), the first substrate can be restored to a desirable position by the eighth electrode 404U disposed at four sides of the third substrate 403U. As described above, by extracting from the electrode at the area on which the minimum effect of the electrostatic force is exerted, the extraction from an electrode can be done without decreasing the spring force (i.e., restoring force).

In FIG. 7, 3 electrodes (404Ua, 404Ub, and 404Uc) are illustrated as the first electrodes 406U, a similar effect can be produced even if the first electrodes 406U are composed of the more number of strip shaped electrodes. With the first electrodes 406U including a plurality of or the more number of electrodes, an effect that more electric power can be output with respect to the shifting of the first substrate can be produced.

The configuration of the third substrate 403U according to the present embodiment is also applicable to the second substrate. A vibration power generator which includes the second substrate including the sixth electrode having a configuration identical to that of the above described eighth electrode 404U and the second electrodes having a configuration identical to that of the fourth electrodes 406U, and further including, as required, an electrode having a configuration identical to the above described electrode 414U for the sake of an electrical connection of the second electrode is, needless to say, included in the present embodiment.

5. Embodiment 5

Figure 8:
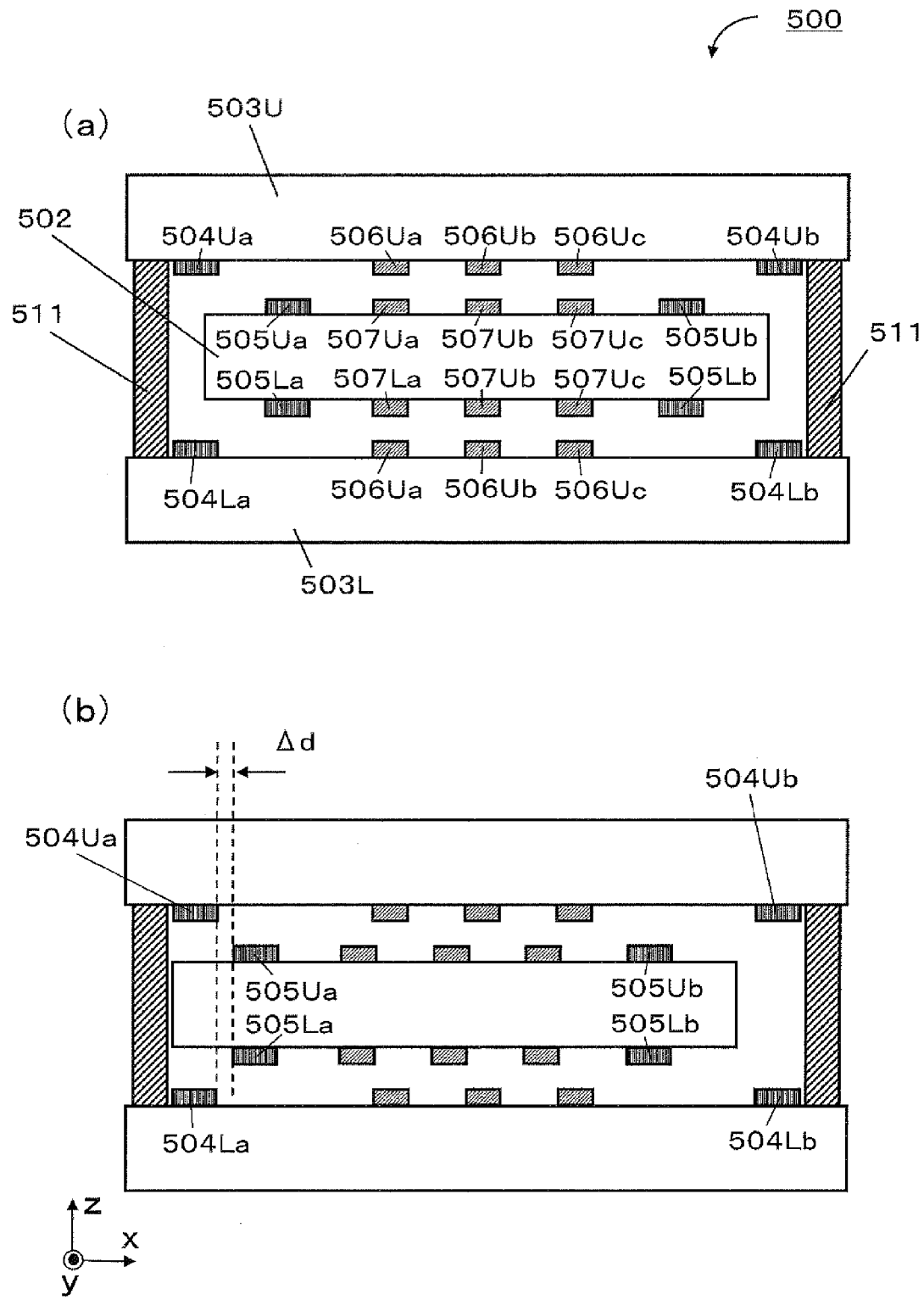
FIG. 8 includes cross sectional views of the vibration power generator according to Embodiment 5 of the present invention.

FIG. 8 illustrates a cross sectional view of a vibration power generator 500 (FIG. 8(a)) and a cross sectional view of the vibration power generator 500 in a state that the first substrate 502 is shifted (FIG. 8(b)), according to a fifth aspect of the present invention.

Each component illustrated in FIG. 8 is provided with a symbol together with the number of 500s in order to clarify that the component is the one according to the present embodiment. Unless otherwise noted, each component may be identical to the corresponding component provided with the same symbol other than the number of 100s of Embodiments 1 to 4.

In other words, the first electrodes 507L (i.e., 507La, 507Lb, and 507Lc) have a polarity identical to a polarity of the third electrodes 507U (i.e., 507Ua, 507Ub, and 507Uc).

Accordingly, as similar to Embodiment 1, the wiring of a first substrate 502 can be omitted or simplified.

In FIG. 8(a), the third substrate 503U is securely disposed above a second substrate 503L via supports 511. The first substrate 502 is disposed between the third substrate 503U and the second substrate 503L and between the two pieces of supports 511 with a space leaving above and below the first substrate 502. In other words, the first substrate 502 is disposed such that the first substrate 502 floats between the third substrate 503U and the second substrate 503L (i.e., so as to be spaced from the third substrate 503U and the second substrate 503L).

Similar to Embodiment 1, the first substrate 502 is held by the electrostatic force exerted between the fifth electrodes 505La, 505Lb formed on a lower surface of the first substrate 502 and the sixth electrodes 504La, 504Lb formed on an upper surface of the second substrate 503L and the electrostatic force exerted between the seventh electrodes 505Ua, 505Ub formed on an upper surface of the first substrate 502 and the eighth electrodes 504Ua, 504Ub formed on a lower surface of the third substrate 503U.

Here, for a simple description, descriptions of the wiring and the projections are omitted here.

The first substrate 502 can be shifted to the x-axis direction, wherein a range in which the first substrate 502 can be shifted (i.e., vibrated) is controlled by two pieces of supports 511. In other words, the first substrate 502 can be shifted up to a position at which one end of the first substrate 502 contacts the corresponding support 511.

The sixth electrodes 504La and 504Lb are formed in the adjacent to the supports 511 (i.e., in the adjacent to end faces of the second substrate 503L), respectively. Also, the fifth electrodes 505La and 505Lb are formed in the adjacent to end faces of the first substrate 502 and via predetermined areas from the end face, respectively.

When the first substrate 502 vibrates to be shifted between the two pieces of supports 511, the fifth electrodes 505La and 505Lb are formed so as not to overlap with the sixth electrodes 504La and 504Lb (i.e., such that the fifth electrodes 505La and 505Lb are always positioned inside the sixth electrodes 504La and 504Lb in the x-axis direction). In other words, sizes (i.e., lengths in the x-axis direction) of the areas provided on the end faces of the first substrate are set so as to be larger than sizes (i.e., lengths in the x-axis direction) of the sixth electrodes 504La and 504Lb.

Similarly, the eighth electrodes 504Ua and 504Ub are formed in the vicinity of the supports 511 (i.e., in the vicinity of end faces of the third substrate 503U). The seventh electrodes 505Ua and 505Ub are formed in the vicinity of end faces of the first substrate 502, respectively, via predetermined areas away from the corresponding end faces.

When the first substrate 502 vibrates to be shifted between the two pieces of supports 511, the seventh electrodes 505Ua and 505Ub are formed so as not to overlap the eighth electrodes 504Ua and 504Ub (i.e., such that the seventh electrodes 505Ua and 505Ub are always positioned inside the eighth electrodes 504Ua and 504Ub in the x-axis direction). The areas provided on the end faces of the first substrate 502 are formed so as to have sizes (i.e., lengths in the x-axis direction) larger than sizes (i.e., lengths in the x-axis direction) of the eighth electrodes 504Ua and 504Ub.

An operation of the vibration power generator 500 having the above configuration is described below.

The vibration power generator 500 generates electric power by causing the first substrate 502 to shift with respect to the second substrate 503L and the third substrate 503U according to the vibration suffered from the outside. At the time, the first substrate 502 is shifted by the vibration suffered from the outside. However, in a case where the first substrate 502 is shifted to the upmost limit between two pieces of supports 511, the first substrate 502 is applied with a force in a direction opposite to the shifting direction of the first substrate 502 by the electrostatic force since no overlapped areas are generated between the fifth electrodes 505La and 505Lb and the sixth electrodes 504La and 504Lb and between the seventh electrodes 505Ua and 505Ub and the eighth electrodes 504Ua and 504Ub including the films retaining the electric charges.

Here, what is meant by no occurrence of the overlapped areas between the fifth electrodes 505La and 505Lb and the sixth electrodes 504La and 504Lb is that the fifth electrodes 505La and 505Lb do not completely overlap the sixth electrodes 504La and 504Lb, respectively.

In other words, even in a case where the first substrate 502 is shifted as much as possible as it is illustrated in FIG. 8(b), a distance $\Delta d$ between an end of the fifth electrode and an end of the sixth electrode (i.e., between an end of the fifth electrode 505La and an end of the sixth electrode 504La in FIG. 8(b)) in the x-axis direction is larger than 0 ($\Delta d > 0$).

Similarly, a distance Δd between an end of the seventh electrode and an end of the eighth electrode is also larger than 0 (Δd>0).

In the vibration power generator 500, the following effect can be produced with the above configuration.

(8) A large amplitude vibration can be achieved within a low frequency range.

A description will be made below as to the above (8).

The fifth electrodes 505La and 505Lb and the seventh electrodes 505Ua and 505Ub are formed on the first substrate 502, respectively, spaced apart from the end faces of the first substrate 502 (with a certain distance) and thus the above arrangement of the electrodes differs from those of Embodiments 1 to 4. In the above described embodiment, in order to secure the electrostatic force, the first substrate is required to be prevented from the shifting up to the end face within the space by set the spring force (i.e., electrostatic force) relatively larger. As a result thereof, the spring force is required to be made stronger to some extent.

On the other hand, with the above configuration of the present embodiment, also, in a case where the electrostatic force is made weaker to cause the first substrate 502 to perform a large amplitude vibration, an overlapped area between the fifth electrodes 505La and 505Lb and the sixth electrodes 504La and 504Lb and an overlapped area between the seventh electrodes 505Ua and 505Ub and the eighth electrodes 504Ua and 504Ub do not occur. As a result thereof, the electrostatic force occurs in a direction opposite to the shifting direction of the first substrate 502 (more specifically, a direction of a sum of vectors of a direction of the second substrate (i.e., x-axis direction) and a direction vertical to the direction of the second substrate (i.e., z-axis direction)). Therefore, by minimizing the spring force (i.e., electrostatic force), a large amplitude vibration can be realized in a lower frequency range, thereby enabling generation of electric power.

The vibration power generator 500 can also generate electric power as follows. For example, without providing the seventh electrodes 505U (i.e., 505Ua and 505Ub) and the eighth electrodes 504U (i.e., 504Ua and 504Ub), the fifth electrodes 505L (i.e., 505La and 505Lb) and the sixth electrodes 504L (504La and 504Lb) are provided to cause the electrostatic force to effect only on the lower side of the first substrate 502.

An embodiment in which the electrodes which generate the restoring force are provided only on one side of the first substrate 502 is also included, as a matter of course, in the present embodiment.

Figure 9:
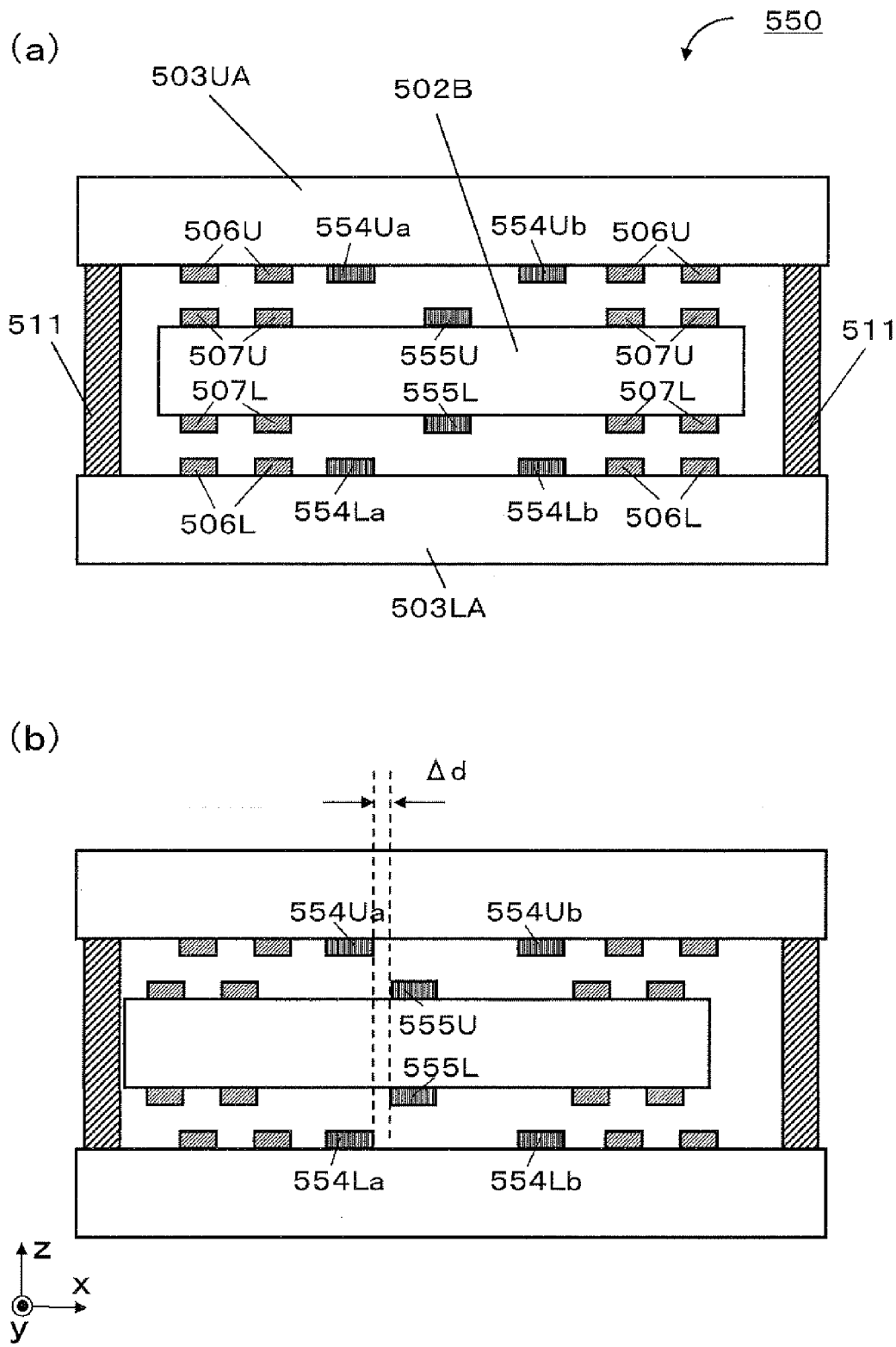
FIG. 9 includes cross sectional views illustrating another configuration of the vibration power generator according to Embodiment 5 of the present invention.

FIG. 9 includes a cross sectional view of another vibration power generator 550 (FIG. 9(*a*)), and a cross sectional view of the vibration power generator 550 in a state that a first substrate 502A is shifted (FIG. 9(*b*)) according to Embodiment 5 of the present invention.

In the embodiment illustrated in FIG. 8, the first substrate 502 is provided with an area where the electrostatic force occurs at peripheries (i.e., in the vicinity of the ends) of the first substrate 502. To the contrary, in an embodiment illustrated in FIG. 9, a fifth electrode 555L and sixth electrodes 554La and 554Lb are provided on a central portion (i.e., central portion in the x-axis direction) of a lower surface of the first substrate 502A and a central portion of an upper surface of the second substrate 503LA, respectively. Further, a seventh electrode 555U and eighth electrodes 554Ua and 554Ub are provided on a central portion (i.e., central portion in the x-axis direction) of the upper surface of the first substrate 502A and a central portion of a lower surface of a third substrate 503UA, respectively.

The above embodiment is also included in the present embodiment.

Also in this case, in a case where the first substrate 502A is shifted as much as possible between two pieces of supports 511, the vibration power generator 550 can produce an effect equivalent to the effect produced by the vibration power generator 500 by causing the first substrate 502A to have such a configuration that an overlapped area between the fifth electrode 555L and the sixth electrodes 554La and 554Lb and an overlapped area between the seventh electrode 555U and the eighth electrodes 554Ua and 554Ub are not generated.

Further, the embodiment of FIG. 9 has such an advantageous configuration that the number of the fifth electrode 555L and the seventh electrode 555U can be singular, respectively.

A plurality of third electrodes 555L and/or a plurality of seventh electrodes 555U may be disposed on the central portions of the first substrate 502A, as required.

Also, in the embodiment illustrated in FIG. 9, the vibration power generator 550 can generate electric power as follows. For example, without providing the seventh electrode 555U and the eighth electrodes 554U, a fifth electrode 555L and sixth electrodes 554L are provide to cause the electrostatic force to effect only on a lower side of the first substrate 502A.

Then, the embodiment in which the electrodes which generate the restoring force are provided only on one side of the first substrate 502A is included, as a matter of course, in the present embodiment.

6. Embodiment 6

Figure 10:
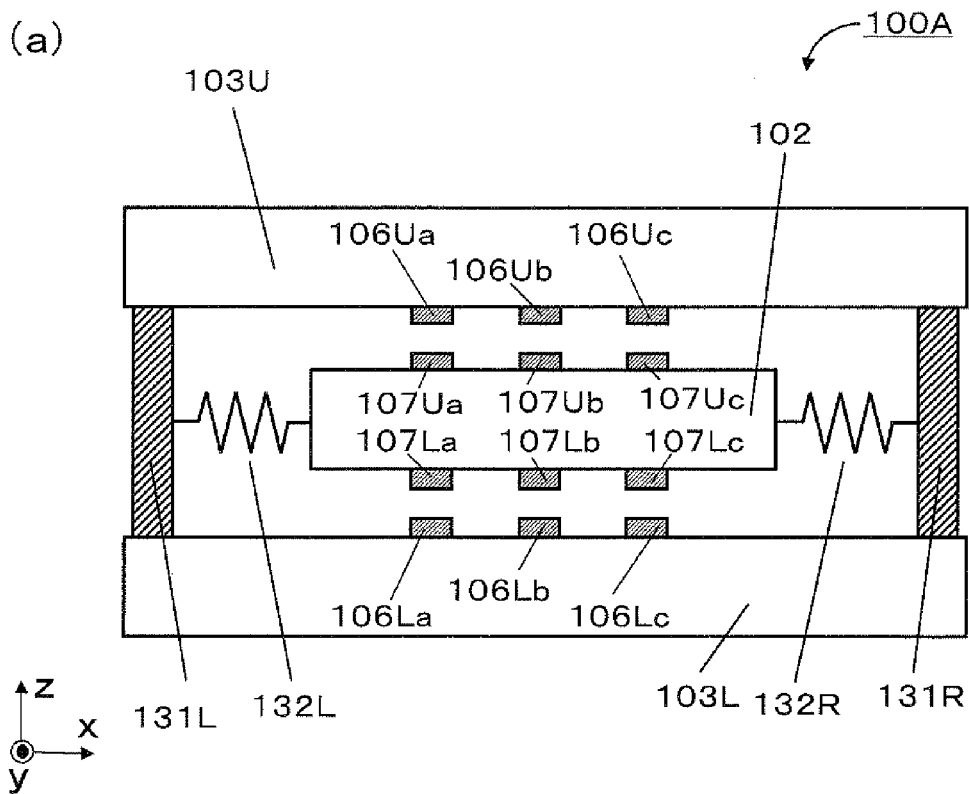
FIG. 10 includes cross sectional views of the vibration power generator according to Embodiment 6 of the present invention.
Figure 10:
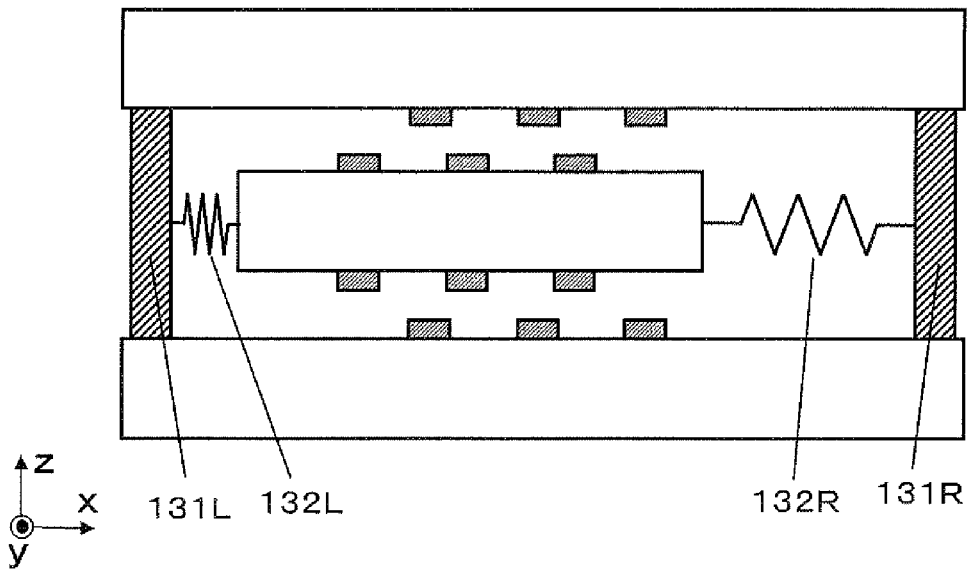
Figure 11:
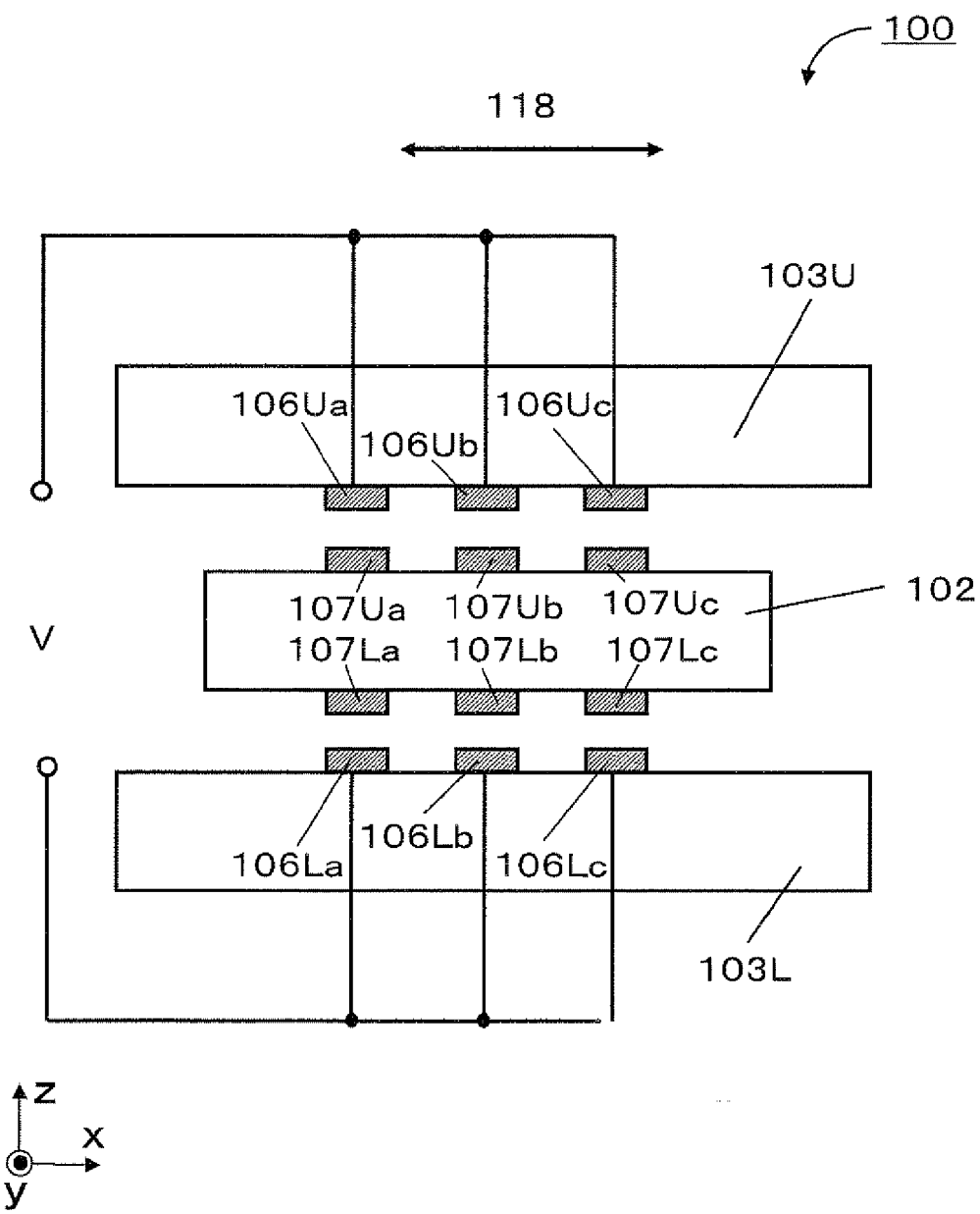
FIG. 11 is across sectional view of a portion contributing to power generation of the vibration power generator illustrated in FIG. 10.

FIG. 10 includes cross sectional views of a vibration power generator 100A according to Embodiment 6 of the present invention. FIG. 10(*a*) illustrates a state that the first substrate 102 is held at a predetermined position and FIG. 10(*b*) illustrates a state that the first substrate 102 is vibrated to be shifted from the predetermined position. FIG. 11 is a cross sectional view of a portion contributing to generation of electric power of a vibration power generator 100A of FIG. 10. FIG. 11 includes illustration of wirings which are omitted in FIG. 10.

The present embodiment differs from Embodiment 1 in that the first substrate 102 is supported (by electrostatic springs) by using the electrostatic force generated between the electret electrodes in Embodiment 1, whereas the first substrate 102 is supported by using the elastic springs 132L and 132R in the present embodiment.

In other words, instead of the fifth electrodes 105La and 105Lb and the sixth electrodes 104La and 104Lb and the seventh electrodes 105Ua and 105Ub and the eighth electrodes 104Ua and 104Ub used in Embodiment 1, elastic springs 132L and 132R are disposed. Supports 131L and 132L are disposed in order to secure one end of each of the elastic springs 132L and 132R.

The supports 131L and 132L may connect, as illustrated in FIGS. 10(*a*) and 10(*b*), the second substrate 103L with the third substrate 103U, as required.

Configurations of the vibration power generator 100A according to the present embodiment other than the above are identical to the configurations of the vibration power generator 100 according to Embodiment 1.

Therefore, configurations different from those of Embodiment 1 are mainly described below.

The first substrate 102 is connected to the supports 131L and 131R via the elastic springs 132L and 132R, respectively. More specifically, the first substrate 102 is vibratably supported thorough the electric springs in the x-axis direction of FIG. 10(*a*) (i.e., a direction of an arrow 118 of FIG. 11).

In other words, in Embodiment 1 (as similar to Embodiments 2 to 5), a plurality of electret electrodes (i.e., the fifth through eighth electrodes) retaining the electric charges of the same polarity is used as restoring force generation members for generating the restoring force which restores the vibrated first substrate to the predetermined position, whereas, the elastic springs 132L and 132R are used as the restoring force generation members in the present embodiment.

Various types of known elastic springs can be used as the elastic springs 132L and 132R. Examples of the elastic spring include a spring composed of a metal, a resin, or a semiconductor and a spring utilizing a fluid, e.g., an air spring.

Configurations of the first electrodes 107La, 107Lb and 107Lc, the second electrodes 106La, 106Lb and 106Lc, the third electrodes 107Ua, 107Ub and 107Uc, and the fourth electrodes 106Ua, 106Ub and 106Uc which contribute to the generation of electric power are identical to the corresponding configurations of Embodiment 1 as illustrated in FIGS. 10(a), 10(b), and FIG. 11. Thus, descriptions thereof are omitted here.

An operation of the vibration power generator 100A is described below.

As described above, the first substrate 102 is shifted by the action (i.e., vibration) from the outside. Then, the first substrate 102 is shifted so as to be returned to the desirable position owing to the elastic springs 132L and 132R.

More specifically, as illustrated in FIG. 10(b), when the first substrate 102 is shifted to the left, the elastic spring 132L is compressed in the x-axis direction. Therefore, the elastic spring 132L attempts to return to the original shape. As a result thereof, the elastic spring 132L imposes the restoring force (i.e., force toward right in FIG. 10(b)) to the first substrate. On the other hand, when the first substrate 102 is shifted to the left, the elastic spring 132R is pulled in the x-axis direction and thus attempts to return to the original shape. As a result thereof, the elastic spring 132R imposes the restoring force (i.e., force toward right in FIG. 10(b)) to the first substrate.

Therefore, while the external force is effecting on the first substrate 102, the first substrate 102 continues to vibrate. On the other hand, when the external force stops effecting on the first substrate 102, the vibration of the first substrate 102 decays and, as illustrated in FIG. 10(a), the first substrate 102 stops at a position at which the a force applied to the first substrate 102 from the elastic spring 132L balances a force applied to the first substrate 102 from the elastic spring 132R.

As described above, similar to the vibration power generator 100 described in Embodiment 1, the shifting (i.e., vibrating) of the first substrate 102 causes a change in an overlapped area between the first electrodes 107L (i.e., 107La, 107Lb and 107Lc) and the second electrodes 106L (106La, 106Lb and 106Lc) and an overlapped area between the third electrodes 107U (107Ua, 107Ub and 107Uc) and the fourth electrodes 106U (106Ua, 106Ub and 106Uc), thereby enabling the vibration power generator 100A to generate electric power.

Similar to Embodiment 1, the first electrodes 107La, 107Lb and 107Lc disposed on one surface of the first substrate 102 has a polarity different from a polarity of the third electrodes 107Ua, 107Ub and 107Uc disposed on the other surface of the first substrate 102. Therefore, a pseudo GND surface appears in the first substrate 102. As a result thereof, without necessity to establish a ground from the first substrate 102 via wiring, the first substrate 102 can be treated as a substrate having been grounded to the GND. Consequently, the wiring is not required any more, resulting in achieving a simplified process and a simplified external circuit.

Preferably, the GND may be established via a flexible wiring such as a lead wire such that the GND is drawn out from the first substrate 102 to establish a ground. Grounding the first substrate 102 to the reference potential (i.e., GND), in addition to formation of the pseudo GND surface, contributes to more stability of the extracted electric potential.

Similar to Embodiment 1, the vibration power generator 100A has effects of a large output power and excellent vibration stability.

As it is illustrated in FIG. 10(a), the second electrodes 106L (i.e., 106La, 106Lb and 106Lc) are formed only portions opposing to the first electrodes 107L (i.e., 107La, 107Lb and 107Lc). However, it is preferable that the second electrodes 106L are formed up to an area beyond the first electrodes 107L. It is more preferable that the second electrodes 106L are formed up to the vibration limit of the first substrate 102 (more specifically, first electrodes 107L).

Also, similar to Embodiment 1, it is preferred that the fourth electrodes 113U are formed up to an area beyond the third electrodes 107U, and it is more preferred that the fourth electrodes 106U are formed up to the vibration limit (i.e., range in which the first substrate 102 can be shifted according to the vibration) of the first substrate 102.

Further, needless to say, a surface (i.e., main surface) of the first substrate 102 may have any shape including a rectangular shape in addition to a square shape.

The number of the elastic springs 132L and 132R is not limited to two as illustrated in FIG. 10, but even may be 1 as far as it can generate the restoring force. However, preferably, a plurality of elastic springs (e.g., 2 or more) are employed for securing generation of the restoring force.

(Variation)

A variation according to the present embodiment will be described below.

Figure 12:
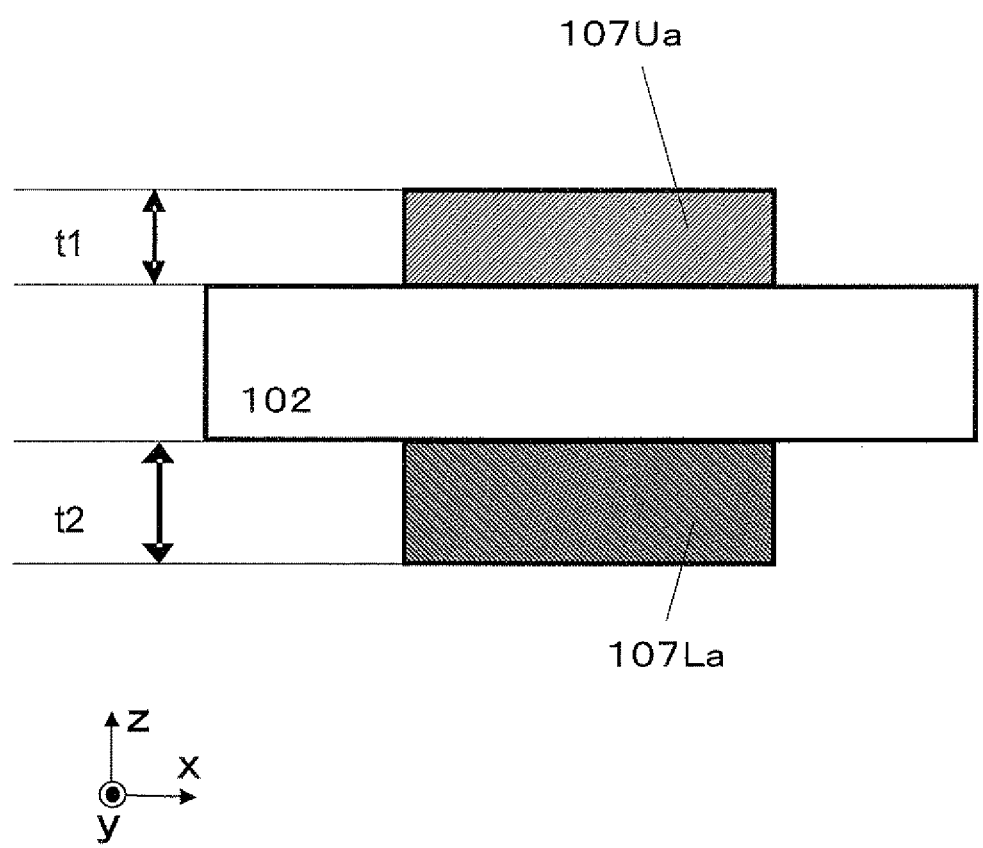
FIG. 12 is a cross sectional view of a variation of a configuration of each of the first electrode and the third electrode according to Embodiment 6 of the present invention.

FIG. 12 is a cross sectional view of the first electrode (i.e., electret electrode) 107La and the third electrode (i.e., electret electrode) 107Ua according to the present variation.

In FIG. 12, only a single first electrode (i.e., first electrode 107La) is illustrated, but the other first electrodes (i.e., first electrodes 107Lb and 107Lc) also have the same configuration. Similarly, the other third electrodes (i.e., second electrodes 107Ub and 107Uc) which are not illustrated in FIG. 12 have a configuration identical to a configuration of the third electrode 107Ua illustrated in FIG. 12.

The first electrode 107L (i.e., 107La) and the third electrode 107U (i.e., 107Ua) are electret electrodes and a thickness t2 (i.e., thickness of the first electrode 107La) differs from a thickness t1 (i.e., thickness of the third electrode 107Ua) as it is illustrated in FIG. 12.

By differentiating the thicknesses of the electrets (i.e., electret electrodes), absolute values of the surface potentials can be matched between the first electrode 107La and the third electrode 107Ua.

More specifically, if the electrets are made of the same material and have the same thicknesses, absolute values of the surface potentials of the electrets normally differ between a case where the electrets are positively charged and a case where the electrets are negatively charged. In the present variation, the thickness t2 of the first electrode 107L and the thickness t1 of the third electrode 107U which are differently charged are adjusted so as to have the same absolute value in the surface potentials.

For example, it is preferable that a substrate having a low resistivity of a range between about 0.1 Ωcm and 100 Ωcm, e.g., a Si substrate, is employed as the first substrate 102.

Accordingly, the electric charge within the first substrate 102 is attracted to an upper electret and a lower electret due to an electric field of the electrets (i.e., 107L and 107U), having the same absolute value and different surface potentials, formed on the upper surface and the lower surface of the first substrate 102, respectively, to cause the electric potential of the first substrate 102 to be approximately zero. As a result thereof, the first substrate 102 can function as the extremely preferable pseudo GND.

Further, in a case where the movable substrate is vibrated according to the vibration to generate electric power, the electric charge moves between the negatively charged electret and the positively charged electret to thereby cause the movable substrate to operate as if the electric charge is supplied from the grounded wire. Therefore, the electric potential of the movable substrate can always function as the GND without causing the movable substrate to be connected to the earth via the wiring.

In addition to the above, since the first electrodes 107L have the surface potential equivalent to the surface potential of the third electrodes 107U, a voltage amplitude of the electric power output from the second electrodes 106L matches that of the fourth electrodes 106U, resulting in that an input voltage input into the voltage converting circuit (not illustrated) becomes equal. Accordingly, the first substrate 102 can operate without the efficiency being degraded even in a case of employing a common circuit.

In the present variation, the electret is directly formed on the movable substrate (i.e., first substrate). However, the same effect can also be produced by forming a conductive film below the electret.

It is needless to say that the same effect can be produced with the formation of the electret on an insulating film such as a thermal oxide film formed on the movable substrate.

In the present variation, as described above, an example in which a low resistance substrate is used as the first substrate is described. However, the same effect can be produced if the resistance of the substrate is smaller to an impedance of the power generation portion.

The detail of measurement of the surface potential of the electret is shown in Embodiment 9 described below.

7. Embodiment 7

Figure 13:
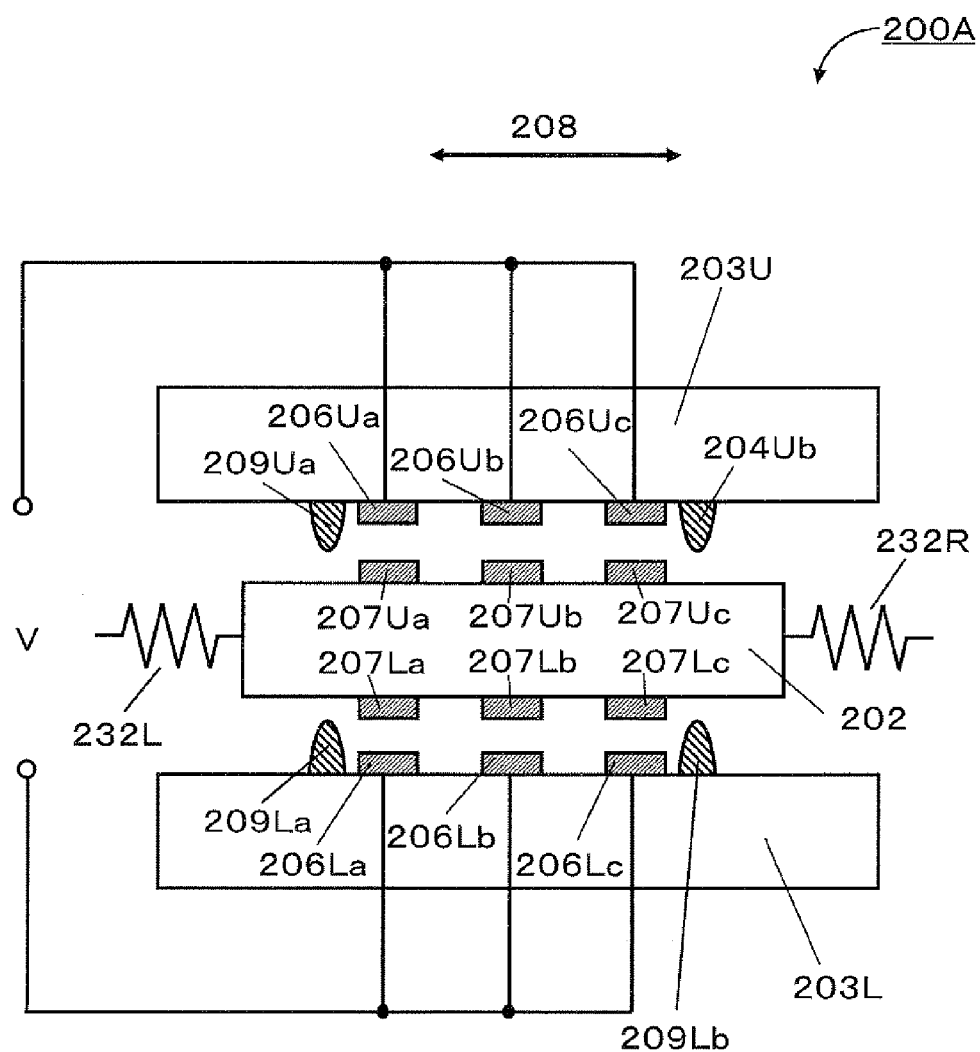
FIG. 13 is a cross sectional view of a vibration power generator according to Embodiment 7 of the present invention.

FIG. 13 is a cross sectional view of a vibration power generator 200A according to Embodiment 7 of the present invention. The present vibration power generator 200A differs from the vibration power generator 200 according to Embodiment 2 illustrated in FIG. 5 in that the fifth electrodes 205La and 205Lb and the sixth electrodes 204La and 204Lb and the seventh electrodes 205Ua and 205Ub and the eighth electrodes 204Ua and 204Ub are used as the restoring force generation members for generating the restoring force which restores the vibrated first substrate 202 to the predetermined position in Embodiment 2, whereas elastic springs 232L and 232R are used as the restoring force generation members in the present embodiment.

Except for the above point, a configuration of the vibration power generator 200A is identical to the configuration of the vibration power generator 200.

The elastic springs 232L and 232R may be identical to the elastic springs 132L and 132R described in Embodiment 6.

The supports 131L and 132L according to Embodiment 6 may be disposed, as required, to receive one ends of the elastic springs 232L and 232R to be secured thereon, respectively.

The vibration power generator 200A configured as described above produces the same effect as the effect produced by the vibration power generator 200 illustrated in Embodiment 2.

8. Embodiment 8

Figure 14:
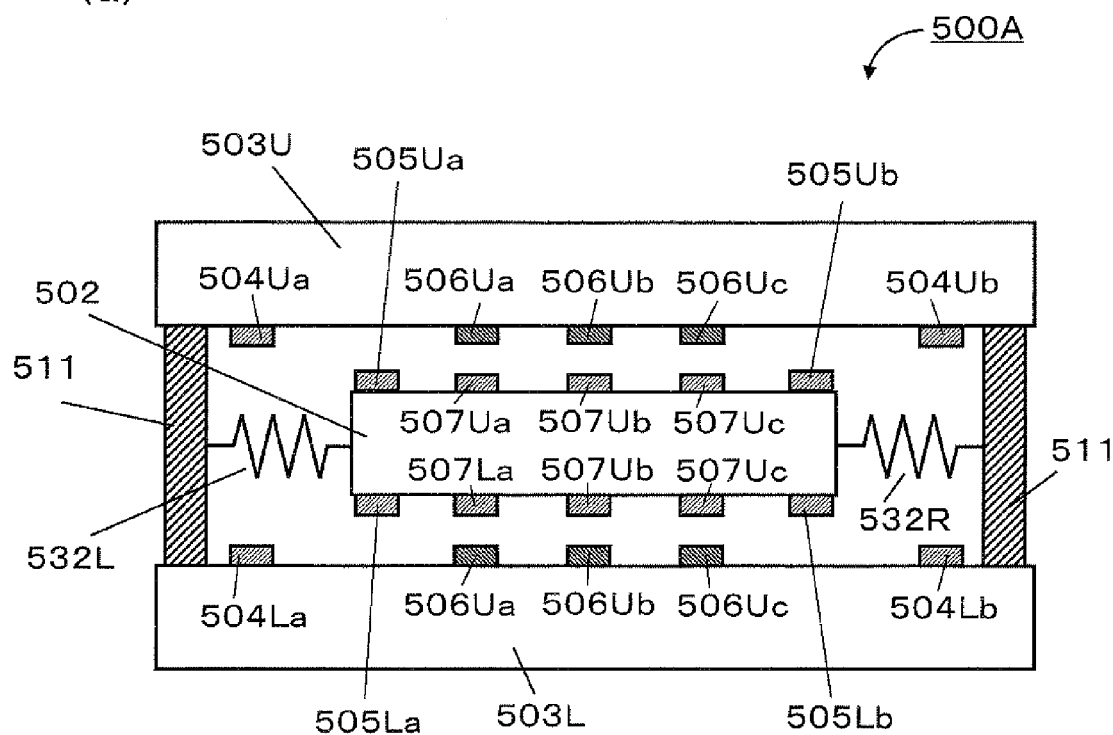
FIG. 14 includes cross sectional views of a vibration power generator according to Embodiment 8 of the present invention.
Figure 14:
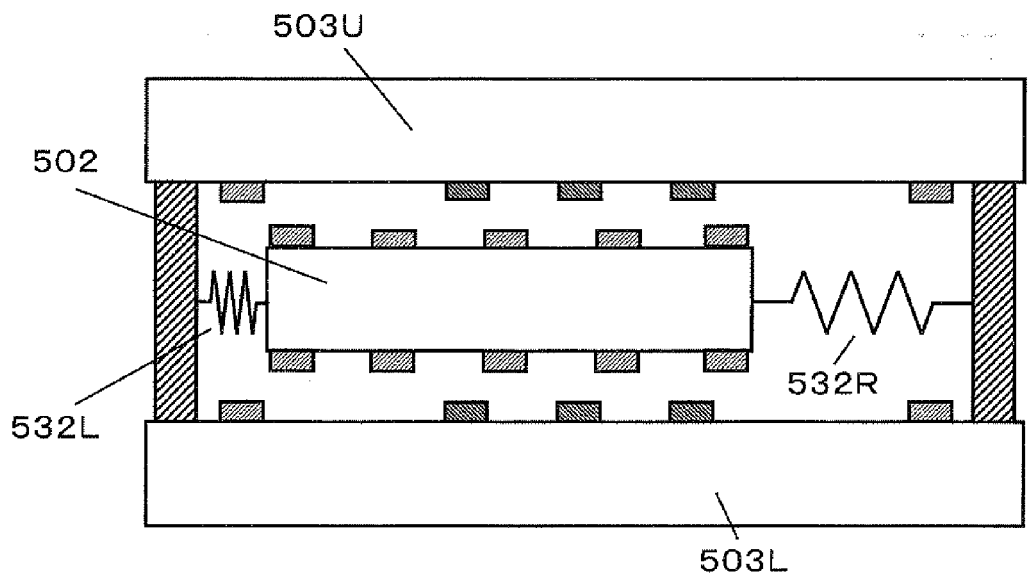

FIG. 14 includes cross sectional views of a vibration power generator 500A according to Embodiment 8 the present invention. FIG. 14(a) illustrates a state that a first substrate 502 is held at a predetermined position, and FIG. 14(b) illustrates a state that the first substrate 502 is shifted to the left as much as possible in FIG. 14.

The present embodiment differs from the vibration power generator 500 according to Embodiment 5 illustrated in FIG. 8 in that the fifth electrodes 505La and 505Lb and the sixth electrodes 504La and 504Lb and the seventh electrodes 505Ua and 505Ub and the eighth electrodes 504Ua and 504Ub, retaining electric charges having the same polarity, are used as the restoring force generation members which generate the restoring force for restoring the vibrated first substrate 502 to the predetermined position in Embodiment 5, whereas elastic springs 532L and 532R are used as the restoring force generation members in the present embodiment in addition to the above fifth through eighth electrodes.

Except for the above point, the vibration power generator 500A has a configuration identical to the configuration of the vibration power generator 500.

The elastic springs 532L and 532R may be identical to the elastic springs 132L and 132R according to Embodiment 6.

In the vibration power generator 500A according to the present embodiment, as described above, elastic forces of the elastic springs 532L and 532R are used as the restoring force in addition to the electrostatic force occurring between the fifth electrodes 505La and 505Lb and the sixth electrodes 504La and 504Lb and the electrostatic force occurring between the seventh electrodes 505Ua and 505Ub and the eighth electrodes 504Ua and 504Ub.

Therefore, stronger restoring force can be forced to effect on the first substrate 502.

As a result of the above, the following effect can be produced.

(8) A collision of the first substrate against side walls is prevented.

A description will be made below in detail with respect to the above (8). In the vibration power generator 500A of the present embodiment, a stronger restoring force can be generated as described above. Specifically, in a case where the first substrate 502 is shifted largely, both of the restoring force caused by the electrostatic force and the restoring force caused by the elastic force become stronger as a shifting amount increases. Therefore, the collision of the first substrate 502 against the supports 511 and side walls of the vibration power generator (not illustrated) can be securely prevented.

A vibration power generator in which elastic springs 532L and 532R are used in the vibration power generator 550 according to Embodiment 5 to improve the restoring force is also included in the present embodiment.

9. Embodiment 9

Figure 15:
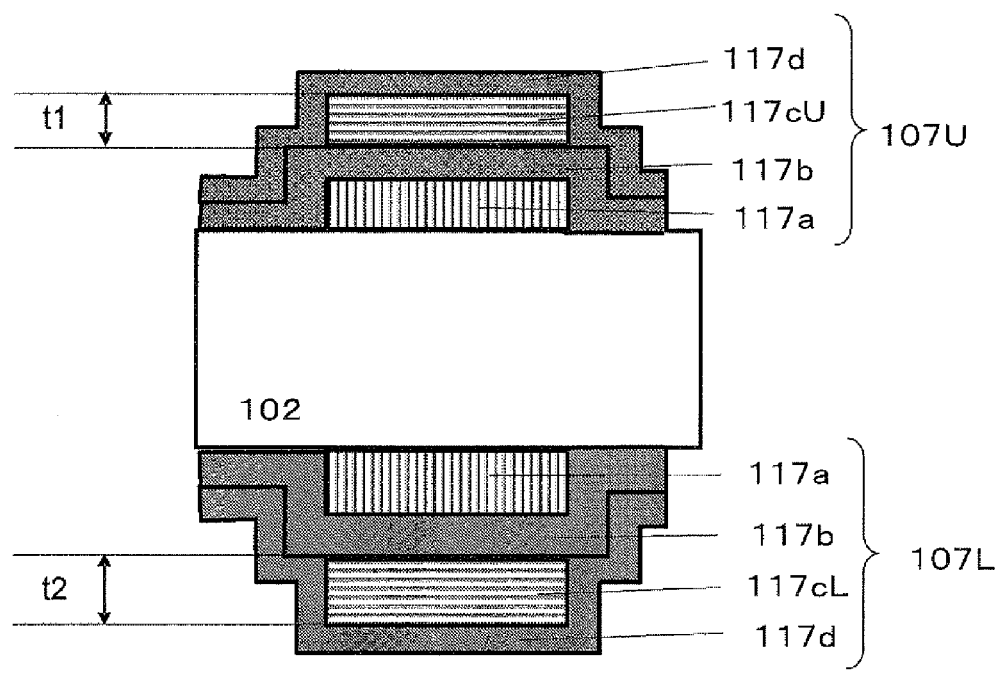
FIG. 15 is a cross sectional view of an electret according to Embodiment 9 of the present invention.

FIG. 15 is a cross sectional view of an electret according to Embodiment 9 of the present invention. The electret of FIG. 15 can be used for either one of the first electrodes, the third electrodes, the fifth electrodes, the sixth electrodes, the seventh electrodes or the eighth electrodes of the electret electrodes used in the vibration power generator according to any one of the Embodiments 1 to 8.

The first electrodes 107L (i.e., 107La, 107Lb and 107Lc) and the third electrodes 107U (i.e., 107Ua, 107Ub and 107Uc) are exemplified here for the sake of an explanation;

however, needless to say, the other electrodes also can have the same configuration on their respective corresponding substrate.

Conductive materials 117a are formed on the first substrate 102. Each conductive material 117a is provided with a first insulating material 117b, an electret film 117c retaining the electric charges (i.e., electret 117cL in the first electrodes 107L and an electret 117cU in the third electrodes 107U), and a second insulating material 117d, formed on the upper surface of the conductive material 117a. At the time, the electret 117cU and the electret 117cL have thicknesses t1 and t2, respectively. The thickness t1 differs from the thickness t2.

As described above, the thicknesses of the electrets 117c are varied according to the polarities of the retained electric charges, thereby being able to equalize absolute values of the surface potentials of the electret 117cU and the electret 117cL independent from the polarities thereof.

The conductive materials 117a of the first electrodes 107L and the third electrodes 107U are electrically connected to each other by using, for example, wiring which passes through the substrate.

Also, the electrets 117c (i.e., 117cL and 117cU) may be formed throughout the conductive materials 117a or may be disposed only partially on the strip shaped conductive materials 117a, respectively. In view of a process and stability of the device characteristics, the electrets 117c are preferably formed partially on the strip shaped conductive materials 117a.

More specifically, it is preferable that a substrate having a high resistivity is used as the first substrate 102. In this case, it is desirable that the electrets 117c are formed only on the conductive materials 117a. With the above described configuration, upon injecting the electric charge, the electric charge can be forcibly injected into the electrets 117c and thus the electrets retaining more stable electric charges can be manufactured.

Examples of the substrate having high resistivity here include not only the substrate having a high resistivity throughout the entire substrate but also a substrate formed with an insulating film such as an oxide film on a surface of the substrate having a low resistivity (e.g., low resistivity silicon substrate). Needless to say, use of the latter can produce an effect similar to the effect produced by the former.

Table 1 shows a measurement result (i.e., absolute values) in which amounts of electric charges of a positive electric charge and a negative electric charge charged to electrets which were tested with films having the same film thickness were measured with the surface potentials.

TABLE 1

| Polarity | Absolute value of surface potential (negative electric charge of 1) |
| --- | --- |
| Positive | 0.92 |
| Negative | 1 |

Figure 16:
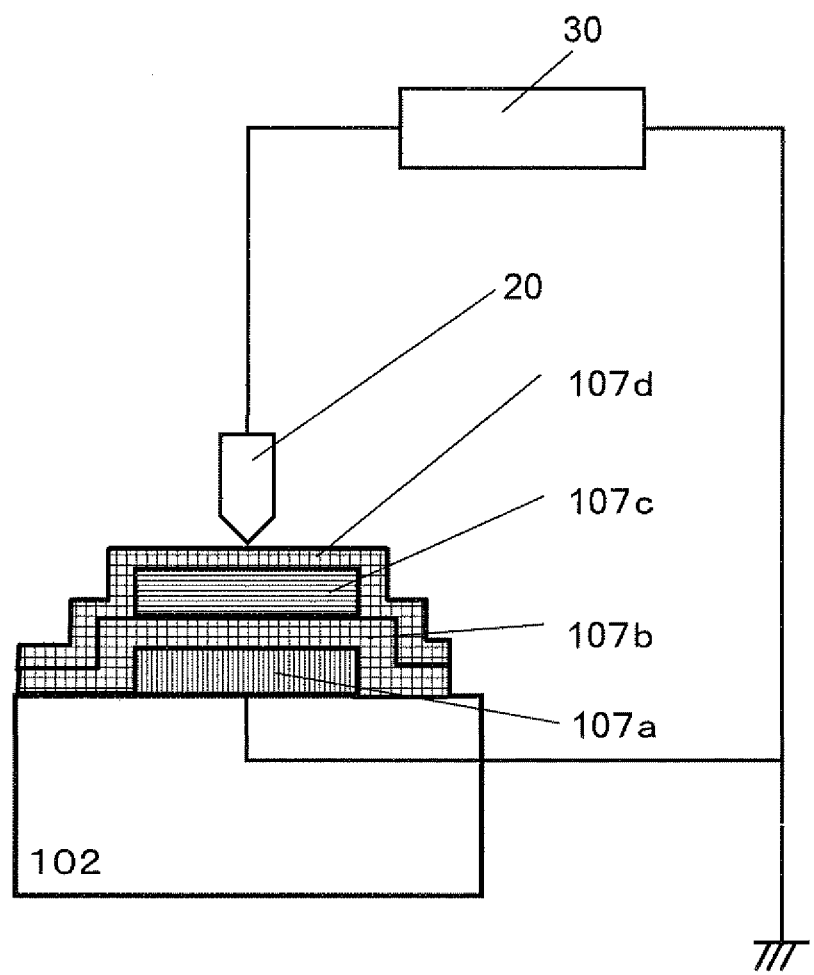
FIG. 16 is a schematic diagram illustrating a measurement method for measuring a surface potential.

FIG. 16 is a schematic diagram illustrating how to measure the surface potential.

A description will be made below as to the measurement of the surface potential with reference to FIG. 16. A conductive material 107a is grounded to the GND as a measurement reference potential. At the time, the measurement is performed such that the measurement reference potential of a surface potential meter 30 is also grounded to the GND. As illustrate in FIG. 16, the conductive material 107a and the measurement reference potential of the surface potential meter 30 are connected to a common GND, thereby being able to obtain a high accuracy in measurement.

An example of a preferable surface potential meter 30 includes a contact type surface potential measure manufactured by, for example, the Trek Inc. Non contact type surface potential meter can also be used.

As illustrated in FIG. 12, also in a configuration that the electret film 107Ua and/or the electret film 107La are directly formed on the first substrate 102, if the measurement reference potential is set to the first substrate 102, the surface potential can also be measured in a similar manner.

The result shown in Table 1 was measured by a method illustrated in FIG. 16 by using the contact type surface potential meter manufactured by, for example, the Trek Inc.

In Table 1, a value when the absolute value of the negative electric charge is set to 1 is shown. A silicon oxide film is used as the electrets 107c. Based on a result of Table 1, it is learned that, if the electrets made of the same material and having the same film thickness are used for the first electrodes 107L and the third electrodes 107U, a gap in retaining the electric charges occurs between the positive electric charge and the negative electric charge.

In view of the above, as shown in Table 2, a film thickness retaining the positive electric charge and a film thickness retaining the negative electric charge are differentiated in order to match the surface potentials (i.e., absolute values).

TABLE 2

| Polarity | Film thickness in a case where absolute values of surface potentials are the same (negative electric charge of 1) |
| --- | --- |
| Positive | 1.07 |
| Negative | 1 |

More specifically, it is learned that, in the vibration power generator having a configuration that electric power is generated at both of the upper surface side and the lower surface side of the first substrate 102, in a case where the electrets (made of the same material) retaining the electric charges having polarities different from each other are used on the upper surface and the lower surface of the first substrate 102, the absolute values of the surface potentials thereof can be matched to each other by selecting the electrets having different film thicknesses.

As described above, when the absolute values of the surface potentials of the first electrodes 107L and the third electrodes 107U become equal, the electric potential of the first substrate 102 becomes approximately zero, and thus the first substrate can function as a remarkably preferable pseudo GND.

Further, in a case where the electric power is generated such that the movable substrate is vibrated according to vibration, the electric charge moves between the negatively charged electret and the positively charged electret, and thus the movable substrate operates as if each of the electric charges is supplied from the grounded wirings. Therefore, the electric potential of the movable substrate can always be used as the GND without establishing the ground through wirings.

With the electret having the above configuration, needless to say, the effects described in the above Embodiments 1 to 8 can be produced.

A description will be made below as to an electret material to be used for the electrets 107c.

As described above, the first electrodes, the third electrodes, the fifth electrodes, the sixth electrodes, the seventh electrodes, and the eighth electrodes are formed into the electret electrodes having electret films retaining the electric charges.

Examples of the electret material composing the electret films 107c include a polymeric material made of polypropylene, polyethylene terephthalate, and polyvinyl chloride or an inorganic material made of silicon oxide. Among those, it is preferable to use the silicon oxide excellent in dielectric strength voltage and heat resistance property.

10. Embodiment 10

A description will be made below as to a vibration power generating device according to Embodiment 10 of the present invention.

Figure 17:
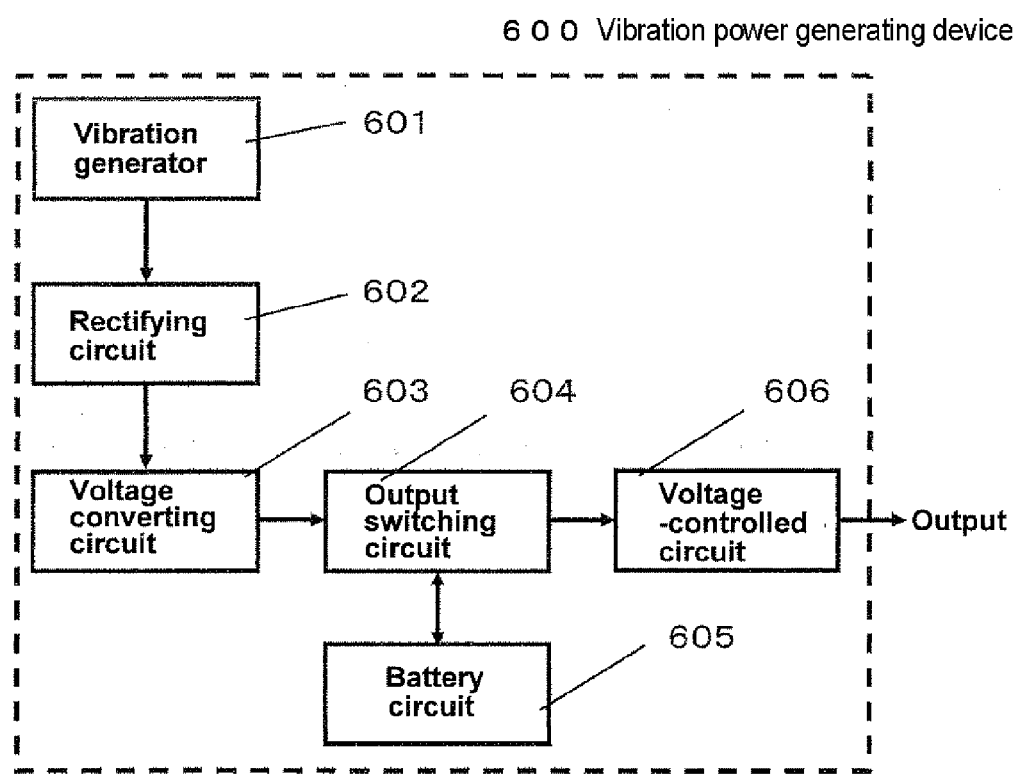
FIG. 17 is a block diagram illustrating the vibration power generating device according to Embodiment 10 of the present invention.

FIG. 17 is a block diagram of a vibration power generating device 600 according to the present embodiment. The vibration power generator 601 illustrated in FIG. 17 is either one of the vibration power generator according to the above described Embodiments 1 to 10.

In FIG. 17, the vibration power generating device 600 is composed of a vibration power generator 601, a rectifying circuit 602, a voltage converting circuit 603, an output switching circuit 604, a battery circuit 605 and a voltage-controlled circuit 606. An AC voltage output from the vibration power generator 601 is converted into a DC voltage by the rectifying circuit 602. The DC voltage is input into the voltage converting circuit 603, the voltage is converted to an output voltage level of the vibration power generating device 600, and thus converted voltage is input into the voltage-controlled circuit 606 or the battery circuit 605 by the output switching circuit 604. In the voltage-controlled circuit 606, the voltage is controlled such that the output voltage becomes constant to be output from the voltage-controlled circuit 606.

An operation of the vibration power generating device 600 having the above described configuration is described below with reference to FIG. 18.

Figure 18:
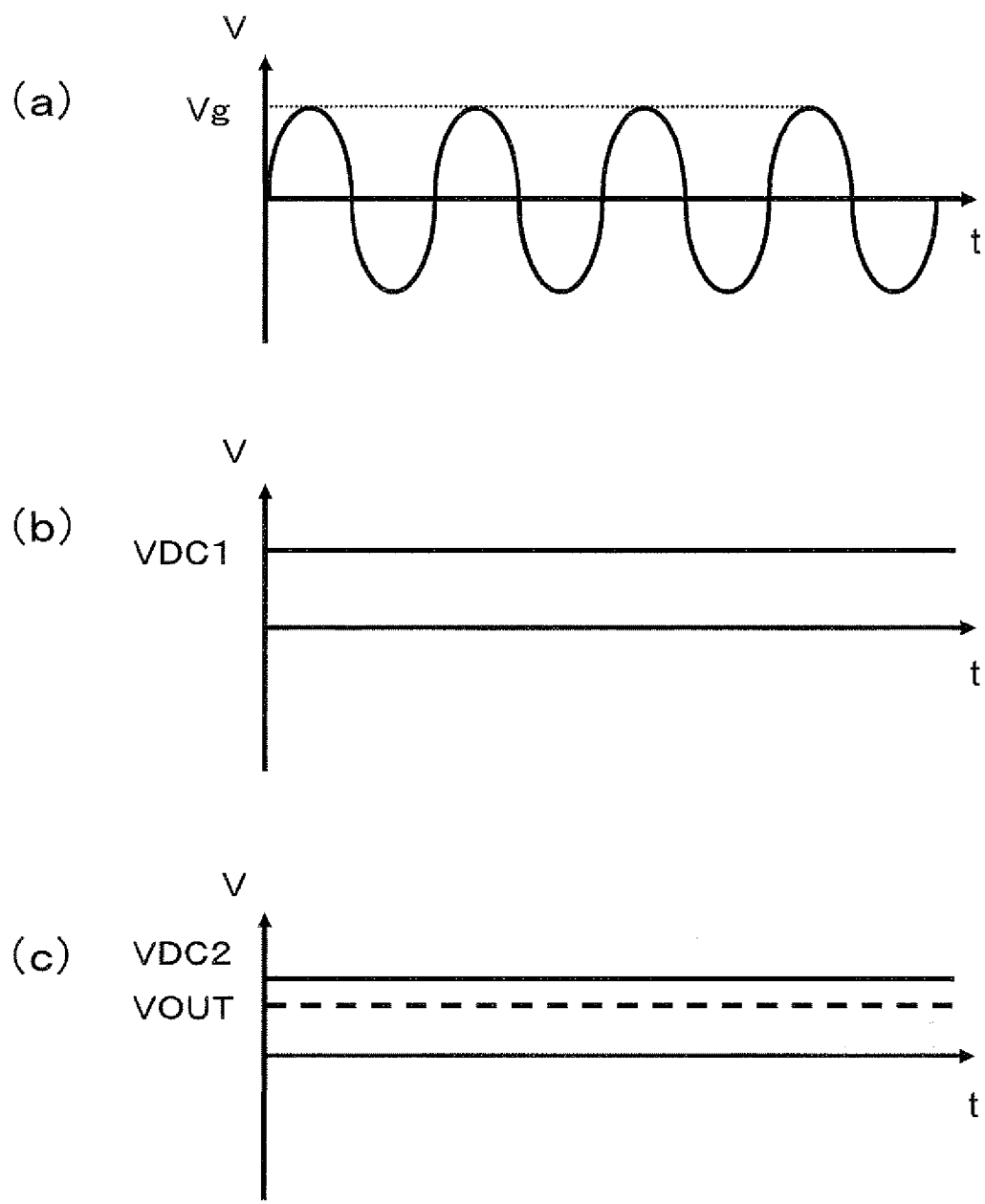
FIG. 18 includes voltage waveforms of each of units of a vibration power generating device according to Embodiment 10 of the present invention.

FIG. 18 illustrates voltage waveforms of each unit of the vibration power generating device 600. FIG. 18(a) illustrates an output voltage waveform of the vibration power generator 601. For the sake of a simple description of the present embodiment, it is assumed that the generation of electric power is effectively performed even at a point the shifting direction of the first substrate changes and further assumed that a sinusoidal voltage is output according to the increase/decrease of the overlapped area created by the vibration of the first substrate. Here, voltage amplitude Vg of the output voltage of the vibration power generator 601 varies according to vibration amplitude of the first substrate, a gap between the first substrate and the third substrate, the amount of retaining electric charges in electret films, a size of an external impedance viewed from the vibration power generator 601, and the like. The AC voltage output from the vibration power generator 601 is converted into a DC voltage VDC1 by the rectifying circuit 602 (FIG. 18(b)). The DC voltage VDC1 is converted so as to be an output voltage level of VDC2 of the vibration power generating device 600 by the voltage converting circuit 603. The output switching circuit 604 does not output the voltage to the voltage-controlled circuit 606 when no voltage output from the vibration power generating device 600 is required, but the output switching circuit 604 stores the generated electric power in the battery circuit 605. To the contrary, when the voltage output from the vibration power generating device 600 is required and an amount of generation of electric power is small, the output switching circuit 604 switches to cause the electric power stored in the battery circuit 605 to be output. An output from the output switching circuit 604 is controlled by the voltage-controlled circuit 606 to a desirable output voltage VOUT and the output voltage VOUT is output (FIG. 18 (c)).

As described above, an output voltage of the vibration power generator 600 varies according to various factors. To correspond this variation, it is desirable to set the VDC2 to a voltage slightly higher than the voltage VOUT which is finally output. With the above setting, the output voltage can be kept constant even with respect to a small voltage fluctuation. A case where 1.8V is output is exemplified here, in a case where the VDC2 is set to 1.8V, if the output voltage of the vibration power generator decreases, the output voltage of the vibration power generator 600 also decreases. However, for example, if the VDC2 is set to 2V, a sufficient control can be realized with respect to a voltage decrease of 0.2 V. That is, a large effect in use can be produced.

Figure 19:
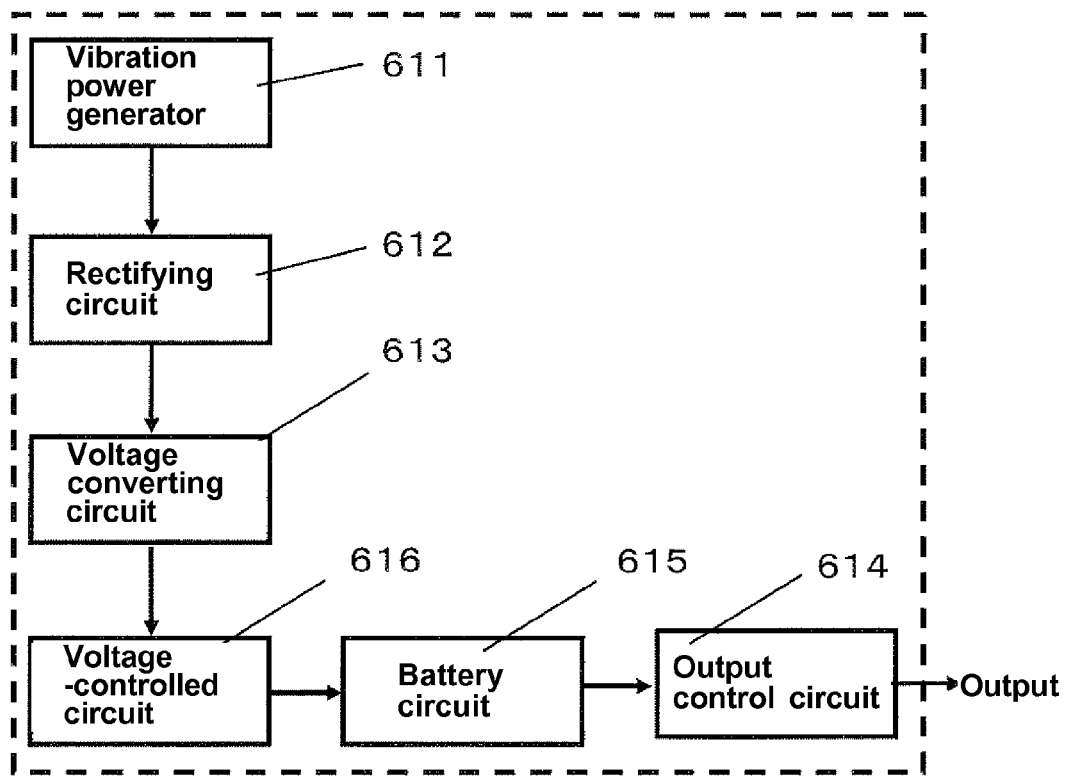
FIG. 19 is a block diagram illustrating another configuration of the vibration power generating device according to Embodiment 10 of the present invention.

FIG. 19 is a block diagram illustrating a vibration power generating device 610 having another configuration according to the present embodiment.

In FIG. 19, the vibration power generator 610 is a vibration power generator described in any one of Embodiments 1 to 9.

The vibration power generating device 610 is composed of a vibration power generator 611, a rectifying circuit 612, a voltage converting circuit 613, an output control circuit 614, a battery circuit 615 and a voltage-controlled circuit 616. An AC voltage output from the vibration power generator 611 is converted into a DC voltage by the rectifying circuit 612. The DC voltage is input into the voltage converting circuit 613 to be converted to a voltage having a voltage level at which a voltage of the vibration power generating device 610 can be controlled. Thus converted voltage is controlled by the voltage-controlled circuit 606 so as to be a desired voltage to be input into the battery circuit 615. In the output control circuit 614, the electric power stored in the battery circuit 615 is controlled to be output according to a condition of a load.

The vibration power generating device 610 having the above described configuration can produce, needless to say, an equivalent effect as the vibration power generating device 600.

An operation of the vibration power generating device 610 is almost identical to the operation of the vibration power generating device 600. However, a setting is made such that the output voltage output from the voltage-controlled circuit 616 is controlled so as to be an optimum voltage to be output to the battery circuit 615. The output control circuit 614 controls an output from the vibration power generating device 610 according to a condition of the load.

11. Embodiment 11

Figure 20:
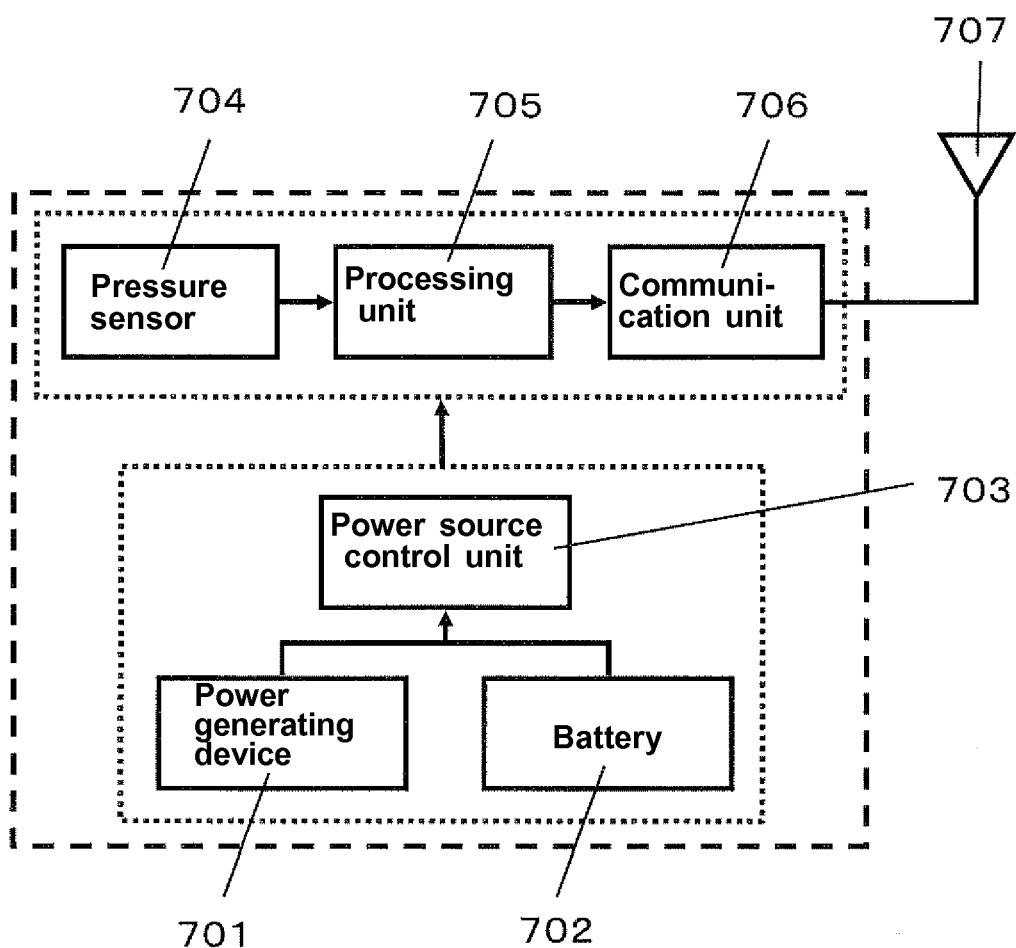
FIG. 20 is a diagram illustrating a communication device using the vibration power generating device according to Embodiment 11 of the present invention.

FIG. 20 is a block diagram of a communication device 700 to be used in a tire pressure monitoring system mounted to a vehicle. In FIG. 20, a power generating device 701 is a vibration power generating device described in Embodiment 10.

In FIG. 20, the communication device 700 is composed of power generating device 701 for generating electric power according to vibration, a battery 702 as a main power source of the communication device or a sub-power source of the power generating device 701, a power source control unit 703 for switching between an output from the power generating device 701 and an output from the battery 702 to supply the output to a circuit unit, a pressure sensor 704 for measuring an air pressure of a tire, a processing unit 705 for processing the output from the pressure sensor to transmit it to a communication unit, a communication unit 706 for converting an input signal input from the processing unit 705 into a high-frequency signal to transmit it to an antenna 707 and the antenna 707.

A description will be made as to an operation of the communication device 700 having the above described configuration.

Electric power essential for the operations of the pressure sensor 704, the processing unit 705 and the communication unit 706 is supplied from the power generating device 701 or the battery 702 by the power source control unit 703. The pressure sensor 704 measures the air pressure of the tire and the measurement result is converted into a voltage signal to input it into the processing unit 705. The signal having been processed by the processing unit 705 is input into the communication unit 706 to be conveyed from the antenna 707 in the form of the high-frequency signal.

As described above, in a case where the vibration power generating device is used as a power source of the communication device, decrease of the number of maintenances such as an exchange of a battery or a condition requiring no change of the battery can be achieved, which produces a large effect in use.

In the present embodiment, an example in which both of the vibration power generating device and the battery are simultaneously used is exemplified. However, if the output power output from the vibration power generating device can satisfactory afford the electric power consumed in circuits such as pressure sensor, the processing unit and the communication unit and the electric power required in communication, only the vibration power generating device may be required in the present embodiment. In this case, the battery and the power source control unit are no longer necessary, which is an advantage in downsizing of a device.

In the present embodiment, a block diagram of the communication device equipped only with the pressure sensor is exemplified. However, needless to say, equivalent effect can be produced in the sensor for detecting an operating condition of a vehicle to control electric power and a communication device equipped with a controlling circuit.

Further, in the present embodiment, a case where a vibration power generator and a vibration power generating device described in Embodiments 1 to 10 are used is exemplified. However, as far as the vibration power generator can convert the vibration suffered from the outside into electric power, needless to say, the other vibration power generator may also produce a similar effect.

12. Embodiment 12

Figure 21:
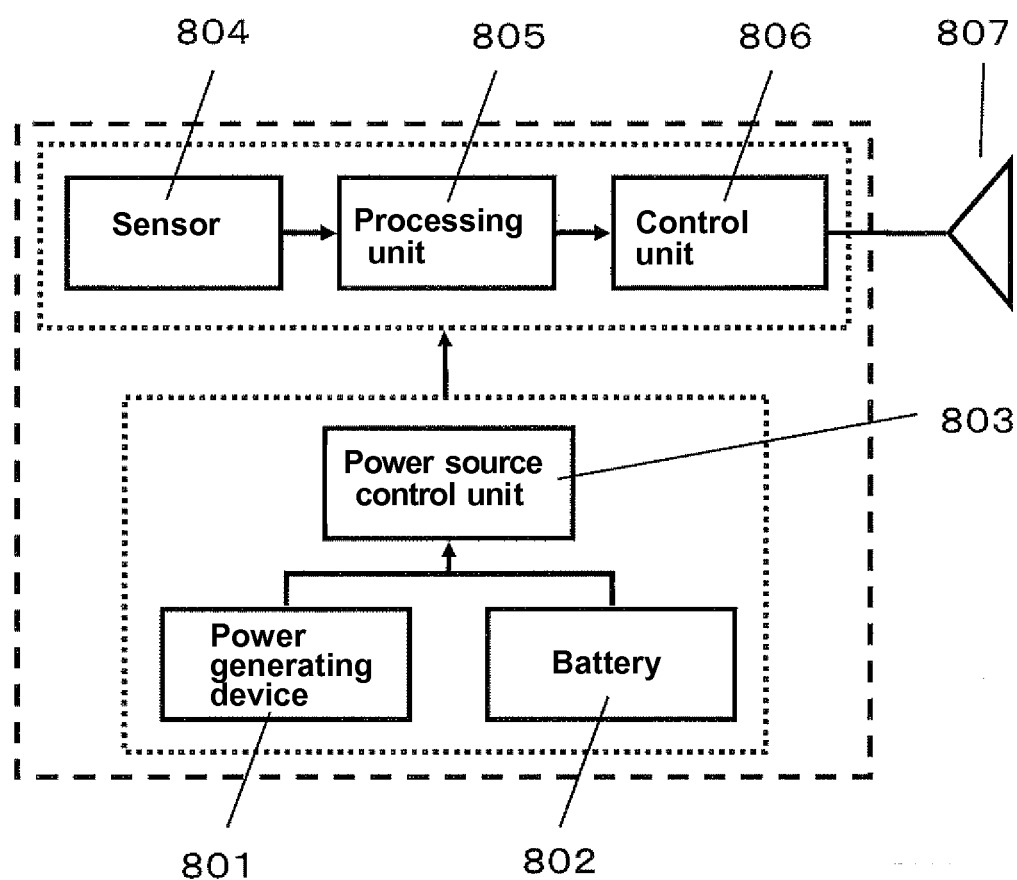
FIG. 21 is a diagram illustrating electronic device using the vibration power generating device according to Embodiment 12 of the present invention.
Figure 22:
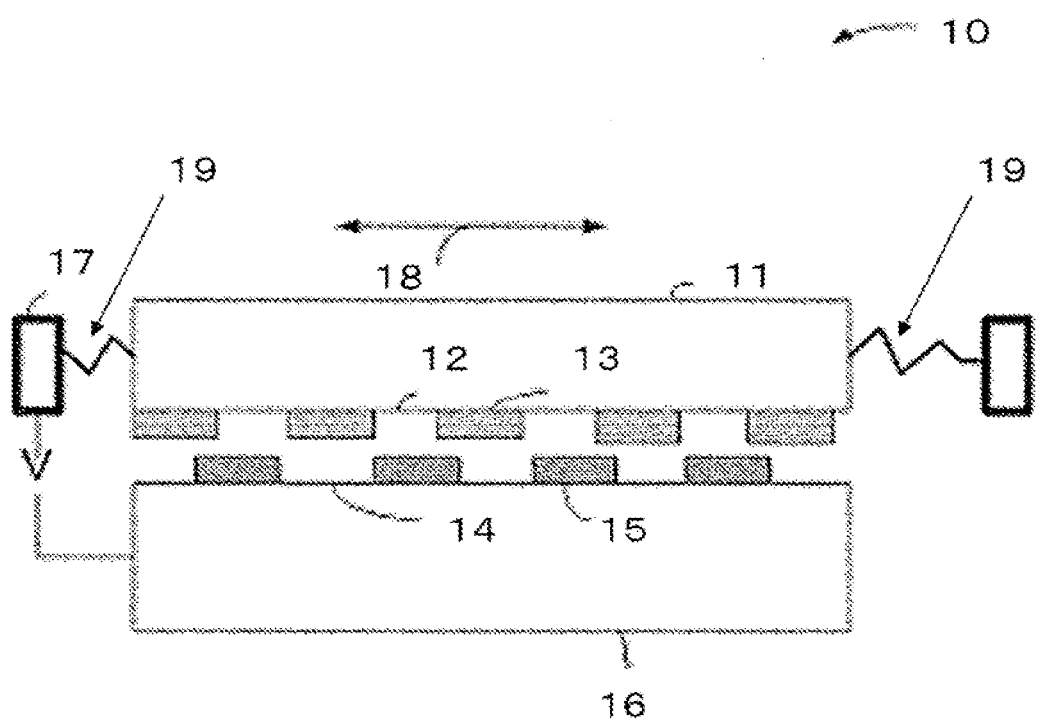
FIG. 22 is a cross sectional view of a conventional electrostatic induction type vibration power generator.

FIG. 21 is a block diagram illustrating an electronic device 800 which is installed in a toy or the like that makes sound. In FIG. 21, the power generating device 801 is the vibration power generating device described in Embodiment 6.

In FIG. 21, the electronic device 800 is composed of power generating device 801 for generating electric power according to vibration, a battery 802 as a main power source of the communication device or as a sub-power source of the power generating device 801, a power source control unit 803 for switching the output from the power generating device 801 and the output from the battery 802 to supply it to the circuit unit, a sensor 804 for detecting a response from the outside (e.g., pushing buttons and tilting), a processing unit 805 for processing the output from the sensor to transmit it to the communication unit, a control unit 806 for transmitting an input signal input from the processing unit 805 to a speaker 807 and the speaker 807.

A description will be made below as to an operation of the communication device (i.e., electronic device) 800 having the above described configuration.

Electric power required for operating the sensor 804, the processing unit 805 and the control unit 806 is supplied from the power generating device 801 or the battery 802 by the power source control unit 803. The sensor 804 detects a reply from the outside to input the detected result in the processing unit 805. If the signal having been processed by the processing unit 805 exceeds a desired value, the signal is input into the control unit 806 and a sound is output from the speaker 807.

As described above, in a case where the vibration power generating device is used as a power source of the electronic device, decrease of the number of maintenances such as an exchange of battery or a condition requiring no change of the battery can be achieved, which produces a large effect in use.

In the present embodiment, a case where the vibration power generating device and the battery are concurrently used is exemplified. However, if the output power from the vibration power generating device can satisfactory afford the electric power consumed by circuits such as a pressure sensor, a processing unit and the communication unit and the electric power required in the communication, only the vibration power generating device may be required. In this case, the battery and the power source control unit are no longer required and the downsizing of the device is efficiently achieved.

In the present embodiment, a case where the vibration power generator and the vibration power generating device described in Embodiments 1 to 8 are used is exemplified. However, as far as the vibration power generator can convert the vibration suffered from the outside into the electric power, needless to say, another vibration power generator can also produce the similar effect.

It is noted that the embodiments disclosed here are mere examples and do not limit the present invention. The scope of the present invention is not constrained by the above description but is to be defined by the scope of claims in which everything equivalent to the scope of claims and all the variations made without departing from the scope of claims are encompassed within the present invention.

This application claims priority on Japanese Patent Application No. 2009-293721, the disclosure of which is incorporated by reference herein

INDUSTRIAL APPLICABILITY

The vibration power generator according to the present invention is effective as an electrostatic induction type vibration power generator. Also, the vibration power generator according to the present invention is remarkably effective in use of a low-power wireless communication module or electronic device.

| Reference Signs List | |
|---|---|
| 100 | Vibration power generator |
| 102 | First substrate |
| 103L | Second substrate |
| 103U | Third substrate |
| 107La, 107Lb, 107Lc | First electrode |
| 106La, 106Lb, 106Lc | Second electrode |
| 107Ua, 107Ub, 107Uc | Third electrode |
| 106Ua, 106Ub, 106Uc | Fourth electrode |
| 105La, 105Lb | Fifth electrode |

-continued

| Reference Signs List | |
|---|---|
| 104La, 104Lb | Sixth electrode |
| 105Ua, 105Ub | Seventh electrode |
| 104Ua, 104Ub | Eighth electrode |
| 108 | Vibration direction |
| 209Ua, 209La, 209Ub, 209Lb | Projection |
| 600 | Vibration power generating device |
| 700 | Communication device |
| 800 | Electronic device |

The invention claimed is:

1. A vibration power generator comprising:
a first substrate;
a first electrode disposed on a lower surface of the first substrate, the first electrode including a film retaining electric charges;
a second substrate disposed away from the first substrate and opposed to the lower surface of the first substrate;
a second electrode disposed on an upper surface of the second substrate so as to be opposed to the first electrode;
a third electrode disposed on an upper surface of the first substrate, the third electrode including a film retaining electric charges;
a third substrate disposed away from the first substrate and opposed to the upper surface of the first substrate; and
a fourth electrode disposed on a lower surface of the third substrate so as to be opposed to the third electrode,
wherein the film retaining the electric charges of the first electrode retains electric charges having a polarity different from a polarity of the film retaining the electric charges of the third electrode,
wherein the vibration power generator further comprises a restoring force generation member for giving a restoring force, the first substrate being held at a predetermined position when an external force is not exerted to the first substrate, the first substrate being restored to the predetermined position when the external force is exerted to the first substrate and thus the first substrate moves with respect to the second substrate,
wherein a plurality of the first electrodes and a plurality of the third electrodes are disposed along a direction of the moving of the first substrate with respect to the second substrate, respectively, and
wherein the first electrode and the third electrode comprise, stacked successively from the first substrate, a conductive material, an insulator and the film retaining the electric charges in this order from, respectively.

2. The vibration power generator according to claim 1, wherein the restoring force generation member comprises an elastic spring connected to the first substrate.

3. The vibration power generator according to claim 1, further comprising a projection secured to the second substrate or the third substrate at one end thereof, wherein the projection is contactable to the first substrate at the other end thereof.

4. A vibration power generating device comprising:
the vibration power generator according to claim 1; and
a rectifying circuit for rectifying an AC output voltage from the vibration power generator to convert the rectified AC output voltage to a DC voltage.

5. The vibration power generating device according to claim 4, comprising:
a voltage conversion circuit for converting the DC voltage output from the rectifying circuit into a desirable voltage level;
a battery circuit for storing electric power generated by a vibration power generator in a case where no output from the vibration power generating device is required;
a voltage-controlled circuit for controlling an output voltage from the voltage conversion circuit or the battery circuit to be a predetermined voltage; and
an output switching circuit for switching an output of the voltage conversion circuit to the battery circuit or the voltage-controlled circuit.

6. The vibration power generating device according to claim 5, wherein an output voltage output from the voltage conversion circuit is set to a value higher than a value of an output voltage output from a vibration generation circuit.

7. A communication device using the vibration power generating device according to claim 4.

8. An electronic device using the vibration power generating device according to claim 4.

9. A communication device comprising the vibration power generator according to claim 1 and a battery.

10. An electronic device comprising the vibration power generator according to claim 1 and a battery.

11. A vibration power generator comprising:
a first substrate;
a first electrode disposed on a lower surface of the first substrate, the first electrode including a film retaining electric charges;
a second substrate disposed away from the first substrate and opposed to the lower surface of the first substrate;
a second electrode disposed on an upper surface of the second substrate so as to be opposed to the first electrode;
a third electrode disposed on an upper surface of the first substrate, the third electrode including a film retaining electric charges;
a third substrate disposed away from the first substrate and opposed to the upper surface of the first substrate; and
a fourth electrode disposed on a lower surface of the third substrate so as to be opposed to the third electrode,
wherein the film retaining the electric charges of the first electrode retains electric charges having a polarity different from a polarity of the film retaining the electric charges of the third electrode,
wherein the vibration power generator further comprises a restoring force generation member for giving a restoring force, the first substrate being held at a predetermined position when an external force is not exerted to the first substrate, the first substrate being restored to the predetermined position when the external force is exerted to the first substrate and thus the first substrate moves with respect to the second substrate,
wherein a plurality of the first electrodes and a plurality of the third electrodes are disposed along a direction of the moving of the first substrate with respect to the second substrate, respectively, and
wherein the restoring force generation member comprises:
a fifth electrode disposed on the lower surface of the first substrate and including a film retaining electric charges; and
a sixth electrode disposed on the upper surface of the second substrate and including a film retaining electric charges, the sixth electrode being disposed so as to generate an electrostatic force between the fifth electrode and the sixth electrode.

12. The vibration power generator according to claim 11, wherein the film retaining the electric charges of the fifth electrode retains electric charges having a polarity identical to that of the electric charges of the film retaining the electric charges of the sixth electrode.

13. The vibration power generator according to claim 11, wherein the restoring force generation member comprises:
- a seventh electrode disposed on the upper surface of the first substrate and including a film retaining electric charges; and
- an eighth electrode disposed on the lower surface of the third substrate and including a film retaining electric charges, the eighth electrode being disposed so as to generate an electrostatic force between the seventh electrode and the eighth electrode.

14. The vibration power generator according to claim 13, wherein the film retaining the electric charges of the seventh electrode retains electric charges having a polarity identical to that of the electric charges of the film retaining the electric charges of the eighth electrode.

15. The vibration power generator according to claim 13,
- wherein the fifth electrode is disposed in a vicinity of an end face of the first substrate,
- wherein the sixth electrode is disposed in a vicinity of an end face of the second substrate and at a position at which the fifth electrode and the sixth electrode do not overlap each other even when the first substrate vibrates,
- wherein the seventh electrode is disposed in the vicinity of the end face of the first substrate, and
- wherein the eighth electrode is disposed in a vicinity of an end face of the third substrate and at a position at which the seventh electrode and the eighth electrode do not overlap to each other even when the first substrate vibrates.

16. The vibration power generator according to claim 13,
- wherein the fifth electrode is disposed on a central portion of the first substrate,
- wherein the sixth electrode is disposed on a central portion of the second substrate and at a position at which the fifth electrode and the sixth electrode do not overlap to each other even when the first substrate vibrates,
- wherein the seventh electrode is disposed at the central portion of the first substrate, and
- wherein the eighth electrode is disposed on a central portion of the third substrate and at a position at which the seventh electrode and the eighth electrode do not overlap to each other even when the first substrate vibrates.

17. The vibration power generator according to claim 13,
- wherein the sixth electrode is formed along an outer circumferential portion of the second substrate,
- wherein the second electrode is formed inside the sixth electrode and electrically connected to an outside via a notch portion provided in the sixth electrode,
- wherein the eighth electrode is formed along an outer circumferential portion of the third substrate, and
- wherein the fourth electrode is formed inside the eighth electrode and electrically connected to the outside via a notch portion provided on the eighth electrode.

18. A vibration power generator comprising:
- a first substrate;
- a first electrode disposed on a lower surface of the first substrate, the first electrode including a film retaining electric charges;
- a second substrate disposed away from the first substrate and opposed to the lower surface of the first substrate;
- a second electrode disposed on an upper surface of the second substrate so as to be opposed to the first electrode;
- a third electrode disposed on an upper surface of the first substrate, the third electrode including a film retaining electric charges;
- a third substrate disposed away from the first substrate and opposed to the upper surface of the first substrate; and
- a fourth electrode disposed on a lower surface of the third substrate so as to be opposed to the third electrode,
- wherein the film retaining the electric charges of the first electrode retains electric charges having a polarity different from a polarity of the film retaining the electric charges of the third electrode,
- wherein the vibration power generator further comprises a restoring force generation member for giving a restoring force, the first substrate being held at a predetermined position when an external force is not exerted to the first substrate, the first substrate being restored to the predetermined position when the external force is exerted to the first substrate and thus the first substrate moves with respect to the second substrate,
- wherein a plurality of the first electrodes and a plurality of the third electrodes are disposed along a direction of the moving of the first substrate with respect to the second substrate, respectively, and
- wherein the film retaining the electric charges of the first electrode has a thickness different from that of the film retaining the electric charges of the third electrode.

* * * * *